United States Patent
Kanai et al.

[11] Patent Number: 5,272,761
[45] Date of Patent: Dec. 21, 1993

[54] METHOD AND APPARATUS FOR INSPECTING LINE WIDTH ON PRINTED BOARD

[75] Inventors: Takao Kanai; Yoshinori Sezaki; Hitoshi Atsuta, all of Kyoto, Japan

[73] Assignee: Dainippon Screen Mfg. Co., Ltd., Japan

[21] Appl. No.: 783,615

[22] Filed: Oct. 25, 1991

[30] Foreign Application Priority Data

Nov. 27, 1990 [JP] Japan .................. 2-327164

[51] Int. Cl.⁵ .................................... G06K 9/00
[52] U.S. Cl. .................................. 382/8; 382/27; 382/48
[58] Field of Search .......................... 382/1, 8, 48, 27; 358/101, 106, 107

[56] References Cited

U.S. PATENT DOCUMENTS

| | | | |
|---|---|---|---|
| 4,500,202 | 2/1985 | Smyth | 356/237 |
| 4,692,943 | 9/1987 | Pietzsch et al. | 382/8 |
| 4,893,346 | 1/1990 | Bishop | 382/8 |
| 5,027,417 | 6/1991 | Kitakado et al. | 382/8 |
| 5,046,120 | 9/1991 | Bishop | 382/54 |

*Primary Examiner*—Jose L. Couso
*Attorney, Agent, or Firm*—Ostrolenk, Faber, Gerb & Soffen

[57] ABSTRACT

An operator for detecting the width of a wiring line on a printed board comprises plurality of arms. Pixels on each arm increase in size toward the end of the arm. When the width of a narrow wiring line is detected on small pixels, while the width of a wide line is detected on large pixels. The operater is obtained by converting a wiring pattern signal into a plurality of signals corresponding to different pixel sizes and then combining respective parts of the plurality of signals with each other.

14 Claims, 22 Drawing Sheets

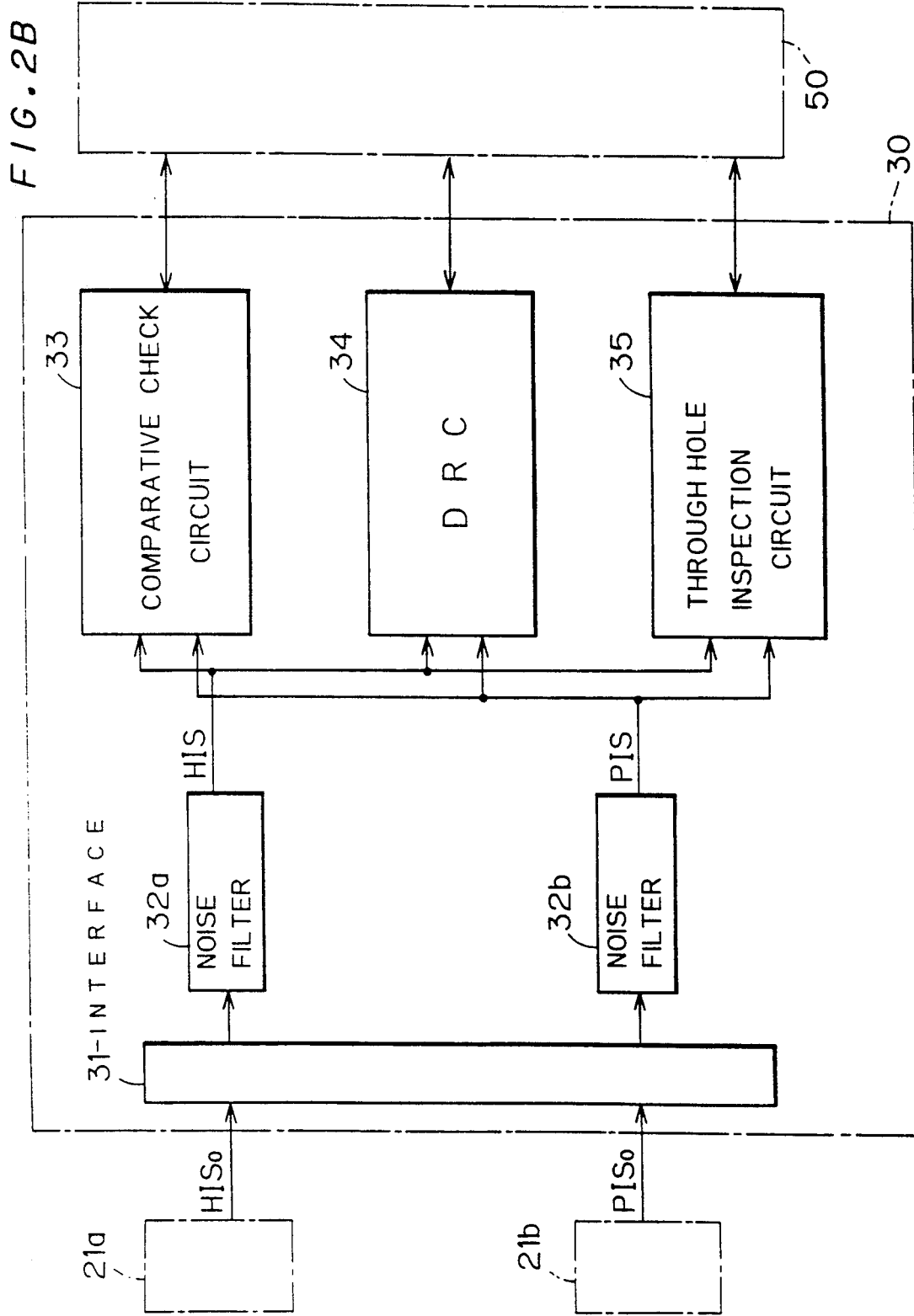

$$G_g = \frac{G_1 + G_2 + G_4 + G_5}{4}$$

$$G_{51} = \frac{G_g + G_5}{2}$$

METHOD AND APPARATUS FOR INSPECTING LINE WIDTH ON PRINTED BOARD

BACKGROUND OF THE INVENTION

1. Field of the Invention

The present invention relates to a method of and an apparatus for inspecting the line width on a printed board, and more particularly, it relates to an improvement for detecting respective lines having different width.

2. Description of the Background Art

As electronic parts have been reduced in size and in weight as well as have been improved in performance, a wiring patterns on printed board circuits have been also highly refined and integrated. Accordingly, required are narrow wiring lines in wiring patterns and small diameters of through holes in printed boards.

As to such narrowed lines, inspection and management of widths, disconnection, or short-circuiting etc. thereof are regarded as more important than before.

In such inspection and management of line width of a wiring pattern, an allowable range of width is previously determined. Then, the line width is compared with the allowable range. When the line width is in the allowable range, it is concluded that the line is not defective. On the other hand, when the line width is out of the allowable range, it is concluded that the line is defective.

In order to obtain the line width, the printed board is photoelectrically scanned to obtain a wiring pattern image of the printed board. The pattern image is binarized to obtain image data, which in turn is subjected to various processings including the above-indicated comparative procedure for determining whether the pattern is defective or not. One of the methods effective for processing the binarized pattern image is a processing with a pixel operator, which is disclosed in Japanese Patent Laying-Open Gazette No. 59-74627 (1984), for example.

However, line width is not constant and varies in the range from about 80 to 400 $\mu$m with the types of printed boards to be inspected, for example. Further, lines of different width may be provided on a single printed board. Thus, the line width should be detected depending upon the type of each board or each line.

For example, it is supposed that a narrow line $L_1$ (FIG. 19) and a wide line $L_2$ (FIG. 20) are formed on the same printed board. In order to accurately measure the width of the narrow line $L_1$, an pixel operator should be applied to a pixel matrix T having a high resolution or fineness. On the other hand, the width of the wide line $L_2$ cannot be measured with a small-scale operator, and therefore, the two dimensional size or the number of pixels in the matrix T should be large under the condition that the resolution in the matrix T is maintained. Further, when a pixel operator is applied to the large-scale matrix space, a number of bits are required to represent the result of the application of the pixel operator and subsequent logical operations on the resultant data becomes complicated.

Japanese Patent Laying-Open Gazette No. 63-78009 discloses a method to solve this problem. In this method, a plurality of pixel operators having different resolutions are defined. A pixel operator having a high resolution is first applied to the line image, and when the high-resolution operator is overflown, a coarse pixel operator is selected in place of the high-resolution operator to thereby obtain an optimum resolution for each line or each printed board. However, this method requires a plurality of pixel operators adapted for the respective resolutions depending upon the line width, and a processing part for switching the operators is required.

SUMMARY OF THE INVENTION

The present invention is directed to a method of inspecting the width of a wiring line formed on a printed board.

According to the present invention, the method comprises the steps of: (a) obtaining an image of the wiring pattern; (b) applying an operator to the image of the wiring pattern to obtain a set of data values, wherein resolution in a center portion of the operator is higher than resolution in peripheral portion of the operator; and (c) calculating the width of the wiring line as a function of the set of data values.

In a preferred embodiment of the present invention, the operator has first and second sets of pixels. The first set of pixels are located in the center portion of the operator, while the second set of pixels are located around the first set of pixels.

Each pixel belonging to the first set of pixels is smaller than each pixel belonging to the second set of pixels.

The operator may have a plurality of arms extending from a center pixel of the operator. Each of the plurality of arms has first and second chains of pixels which correspond to the first and second sets of pixels, respectively, and which are successibly connected. Each pixel belonging to the first chain of pixels has a first size smaller than a second size of each pixel belonging to the second chain of pixels.

The present invention is also provide an apparatus adapted to conduct the present method.

In the present invention, pixels around the center of the pixel operator have high resolutions, while the resolutions are reduced as the pixels are separated from the center. Thus, the pixels, having high resolutions, around the center are adapted to measure the width of narrow lines while outer pixels having low resolutions are adapted to measure the width of wiring lines, so that various line width can be detected with resolutions which are responsive to respective line width.

The method according to the present invention can be conducted without a large-scale matrix space nor a complicated subsequent circuit, as well as without a plurality of operators of different resolutions.

Accordingly, an object of the present invention is to provide a method of and an apparatus for inspecting the width of a line on a printed board which can accurately obtain line widths for a plurality of lines having different width without a large-scale matrix space nor a complicated subsequent circuit and without a plurality of pixel operators adapted for different resolutions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2B is a block diagram showing the structure of a pattern inspection circuit 30;

DESCRIPTION OF PREFERRED EMBODIMENTS

A. Overall Structure and Schematic Operation

Figure 2A:
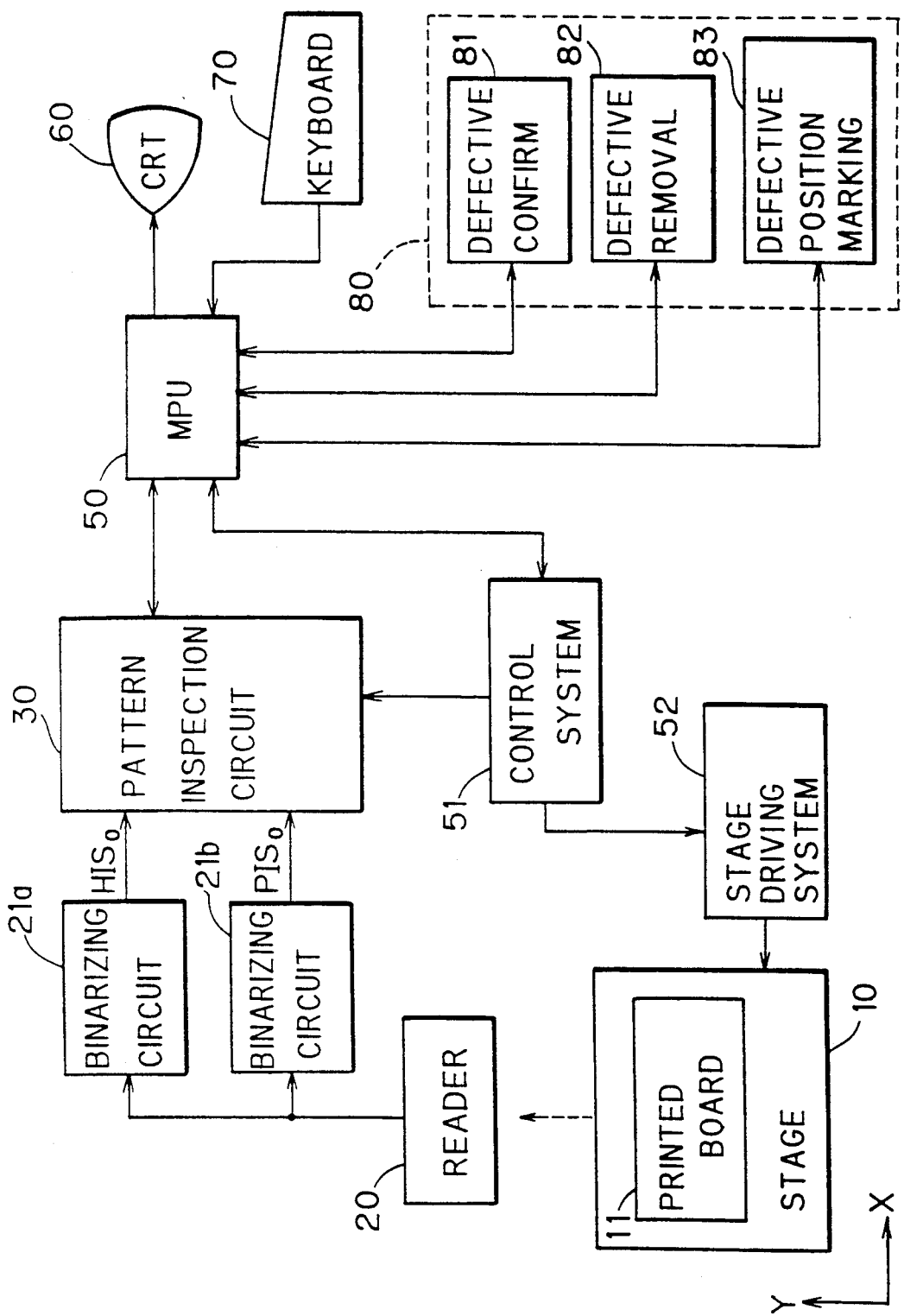
FIG. 2A is a block diagram showing the overall structure of a pattern inspection apparatus according to an preferred embodiment of the present invention.

FIG. 2A is a block diagram showing the overall structure of a pattern inspection apparatus according to a preferred embodiment of the present invention.

A printed board 11 to be inspected is placed on a stage The printed board 11 is fed in a carriage direction Y while the image of the printed board 11 is read with an image reader 20 for each scanning line defined in the direction X. The image reader 20 has a plurality of CCD linear sensors each having thousands of elements in the line direction X, and is operable to read the pattern of the printed board 11 for each pixel. The image data obtained in the image reader 20 are fed to binarizing circuits 21a and 21b. The binarizing circuit 21a generates a hole image original signal $HIS_0$ while the binarizing circuit 21b generates a pattern image original signal $PIS_0$. details of which signals $HIS_0$ and $PIS_0$ will be described later. Both of the signals $HIS_0$ and $PIS_0$ are inputted in a pattern inspection circuit 30.

The pattern inspection circuit 30, which has a function as described below, inspects the wiring pattern including lands, and relative positional relation between the same and through holes. The result of the inspection is delivered to a central processing unit (MPU) 50.

The MPU 50 controls the entire apparatus through a control system 51. The control system 51 generates X-Y addresses for specifying addresses of the image data obtained in the pattern inspection circuit 30 etc. It also supplies the X-Y addresses to a stage driving system 52, to control a carrying mechanism for the stage 10.

A CRT 60 receives a command from the MPU 50 and displays various results of operation such as a hole image. A keyboard 70 is used for inputting various instructions to the MPU 50.

A defect confirming apparatus 81, a defective removing apparatus 82 and a defective position marking apparatus 83 etc. are arranged in an option part 80. The defect confirming apparatus 81 is adapted to display detected defects on the CRT 60 in the form of an enlarged image. The defective removing apparatus 82 is adapted to carry a printed board 11 having a defect to a tray for defectives. The defective position marking apparatus 83 is adapted to directly mark a defective portion on the printed board 11 or mark a point on a sheet corresponding to the portion. These apparatuses are optional.

B. Optical Reading System

Figure 3A:
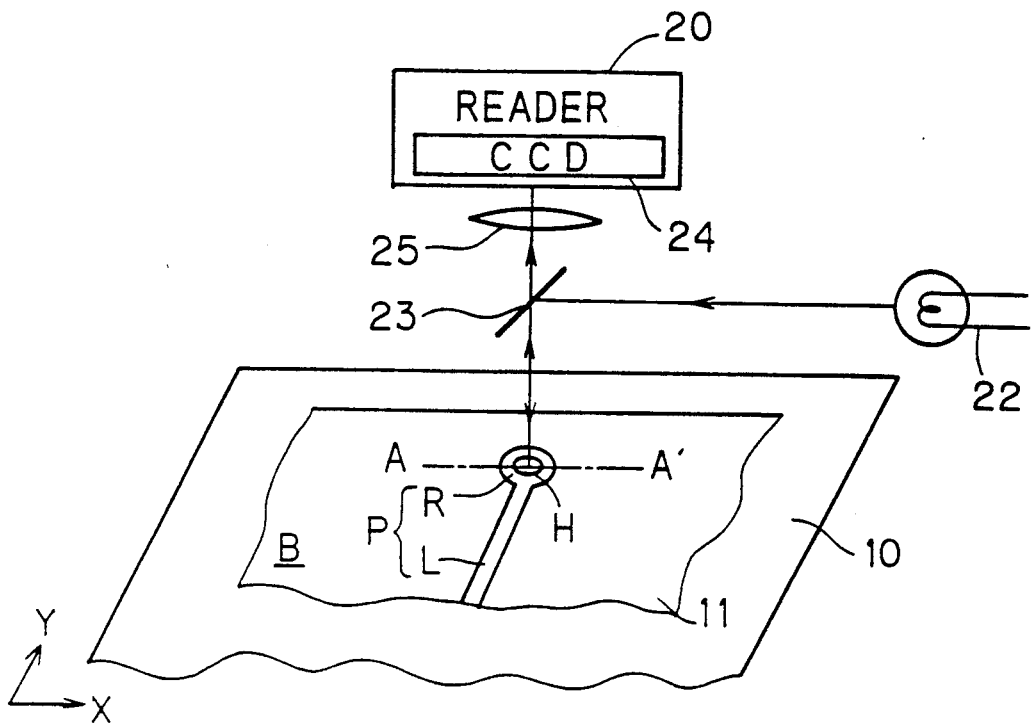
FIGS. 3A and 3B are conceptual diagrams showing image-reading through photoelectric scan.

FIG. 3A illustrates an example of optical reading systems which can be employed in the present invention. The optical reading system comprises the stage 10 shown in FIG. 2A and the image reader 20.

Referring to FIG. 3A, light from a light source 22 is reflected by a half mirror 23, and applied onto the printed board 11 on the stage 10. The printed board 11 is provided with a base plate B serving as an underlayer, a line L, a through hole H and a land R in which an opening of the through hole H. Light reflected from the printed board 11 passes through the half mirror 23, and is incident upon the CCD 24 in the reader 20 through a lens 25. The CCD 24 reads for each scanning line the reflected light from the base plate B, the line L, the through hole H and the land R on the printed board which is fed in the carriage direction Y.

Figure 4:
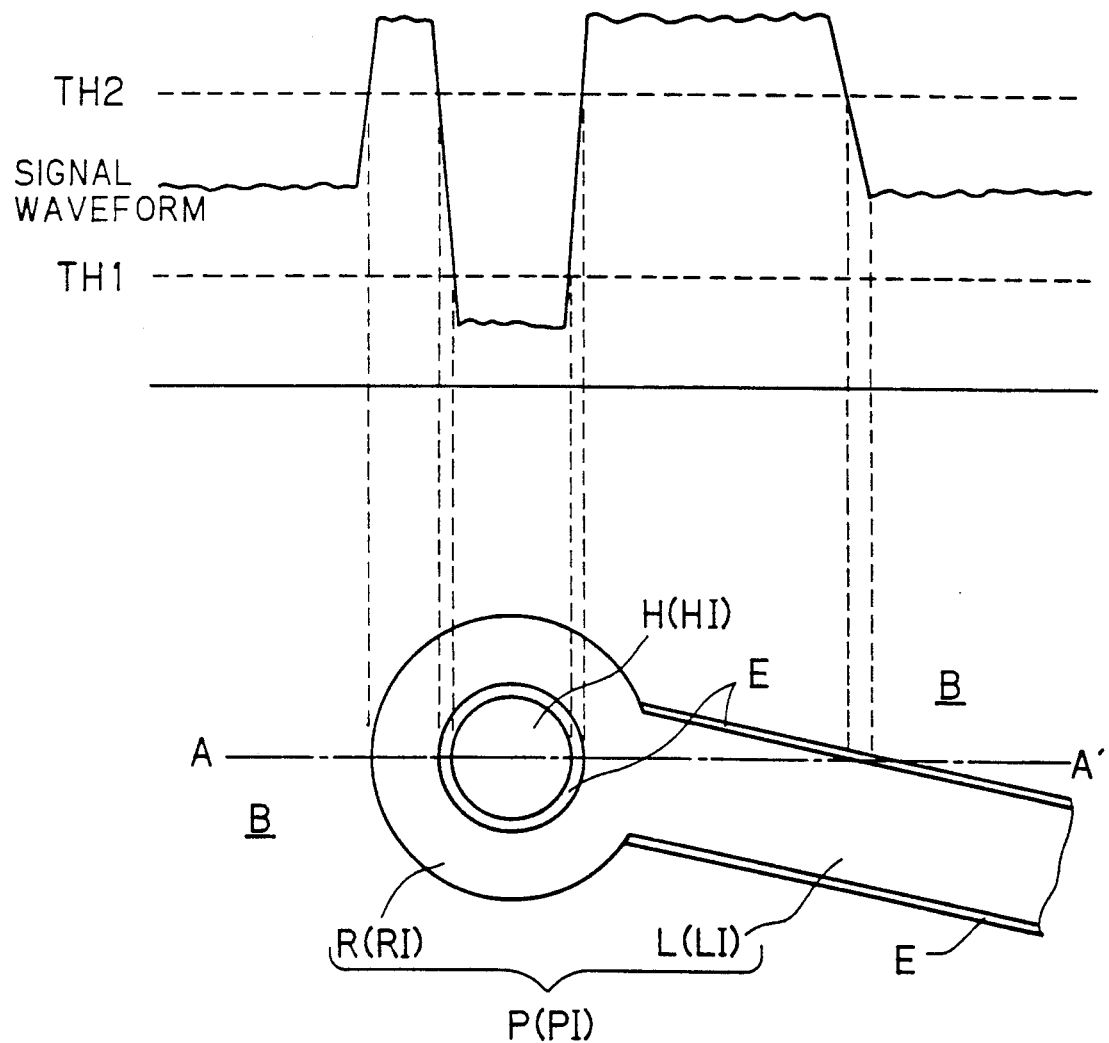
FIG. 4 illustrates a signal waveform obtained through the image-reading with the system shown in FIG. 3A and a pattern obtained therefrom.

FIG. 4 illustrates a graph showing a signal waveform obtained along a line A—A' in FIG. 3A and an exemplary pattern obtained by synthesizing respective signal waveforms for two-dimensional area on the printed board 11.

As shown in the signal waveform of FIG. 4, the intensity of the reflected light is relatively weak in the base plate B, and the signal level thereof is between threshold values TH1 and TH2 (TH1<TH2). Since the wiring pattern P (the line L and the land R) is made of a metal such as copper, the intensity of the reflected light is large on the wiring pattern, and the signal level thereof exceeds the higher threshold value TH2. In the through hole H, substantially no light is reflected and a signal whose level is below the threshold value TH1 is obtained. Edges E are present between the through hole H and the land R as well as between the line L and the base B. Due to irregularities and inclination in the edges E, reflected light levels in these portions is not constant and vary between the threshold values TH1 and TH2.

Signals from the image reader 20 are binarized in the binarizing circuits 21a and 21b shown in FIG. 2A, using the threshold values TH1 and TH2 respectively. The binarizing circuit 21a generates a signal representing a hole image HI corresponding to the through hole H, while the binarizing circuit 21b generates another signal representing a pattern image PI corresponding to the wiring pattern P consisting of the line L and the land R. These signals representing the images HI and PI are subjected to the processings described below.

Figure 3B:
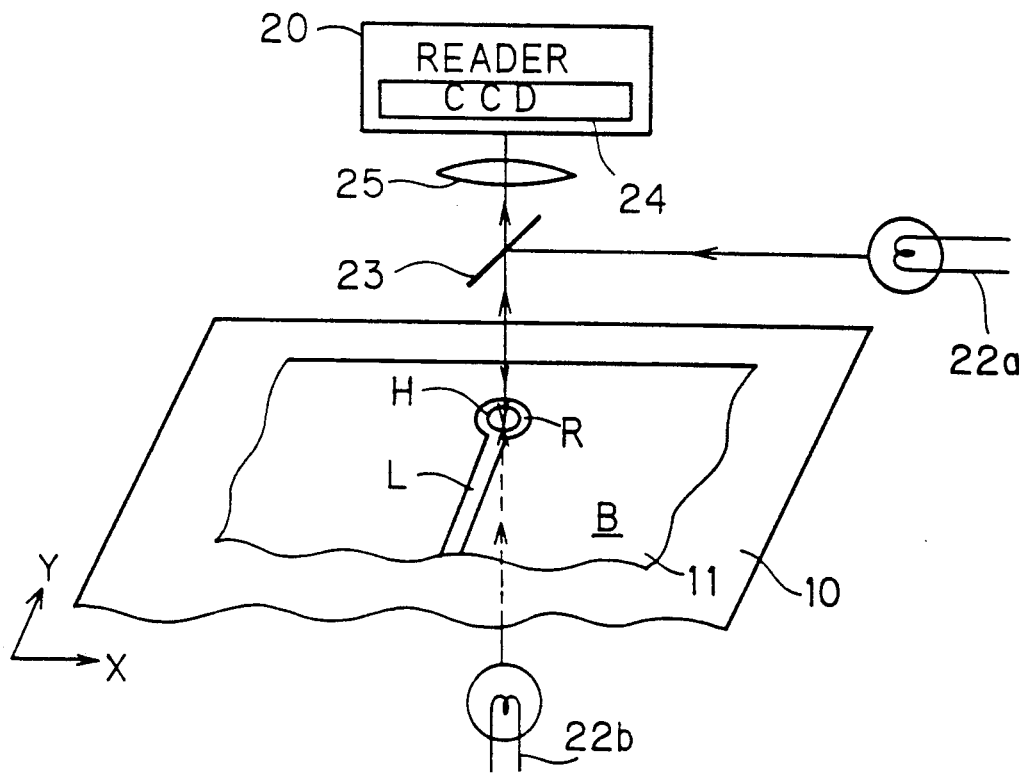

FIG. 3B shows another example of the reading optical system. Similarly to the system shown in FIG. 3A, light from a light source 22a is applied onto the printed board 11 and a reflected light is incident on a CCD 24 in an image reader 20 through a half mirror 23 and a lens 25. In this example, another light source 22b is provided at the rear side of a stage 10, so that light passing through a through hole H is also received by the CCD 24. Therefore, the signal obtained in the CCD 24 is at the highest level in the through hole H, at an intermediate level in a wiring pattern P consisting of a line L and a land R, and at relatively low levels in a base plate B and edges E.

Alternatively, at least two linear arrays of CCDs 24 may be prepared. In this case, the wiring pattern P consisting of the line L and the land R is detected by the combination of the light source 22a and one of the two linear arrays of CCDs 24, while the through hole H is detected by the combination of the light source 22b and the other of the two linear arrays of CCDs 24. The image signals are delivered to respective binarizing circuits provided in a subsequent stage.

C. Pattern Inspection Circuit

FIG. 2B is a block diagram showing the internal structure of the pattern inspection circuit 30 shown in FIG. 2A.

The primary hole image signal $HIS_0$ and the primary pattern image signal $PIS_0$ obtained in the binarizing circuits 21a and 21b shown in FIG. 2A are supplied to noise filters 32a and 32b respectively through an interface 31. The noise filters 32a and 32b remove noises through smoothing processing etc., to generate a hole image signal HIS and a pattern image signal PIS respectively.

Both of the hole image signal HIS and the pattern image signal PIS are supplied to all of a comparative check circuit 33, a DRC (design rule check) circuit 34, and a through hole check circuit 35.

The comparative check circuit 33 is adapted to compare the hole image signal HIS and the pattern image signal PIS with image signals obtained for a reference printed board previously prepared, for specifying portions of the signals HIS and PIS which are different from the reference printed board. The reference printed board is of the same type as the printed board 11 to be inspected and has been previously decided as nondefective.

The through hole check circuit 35 is adapted to detect relative positional relation between the land R and the hole H on the printed board 11 and decide whether or not the same deviates from a value on design, thereby checking whether the printed board 11 is defective or not.

D. DRC Circuit

(D-1) Outline

Before explaining the structure and the operation of each part of the DRC circuit 34, the outline thereof is now described.

Figure 1A:
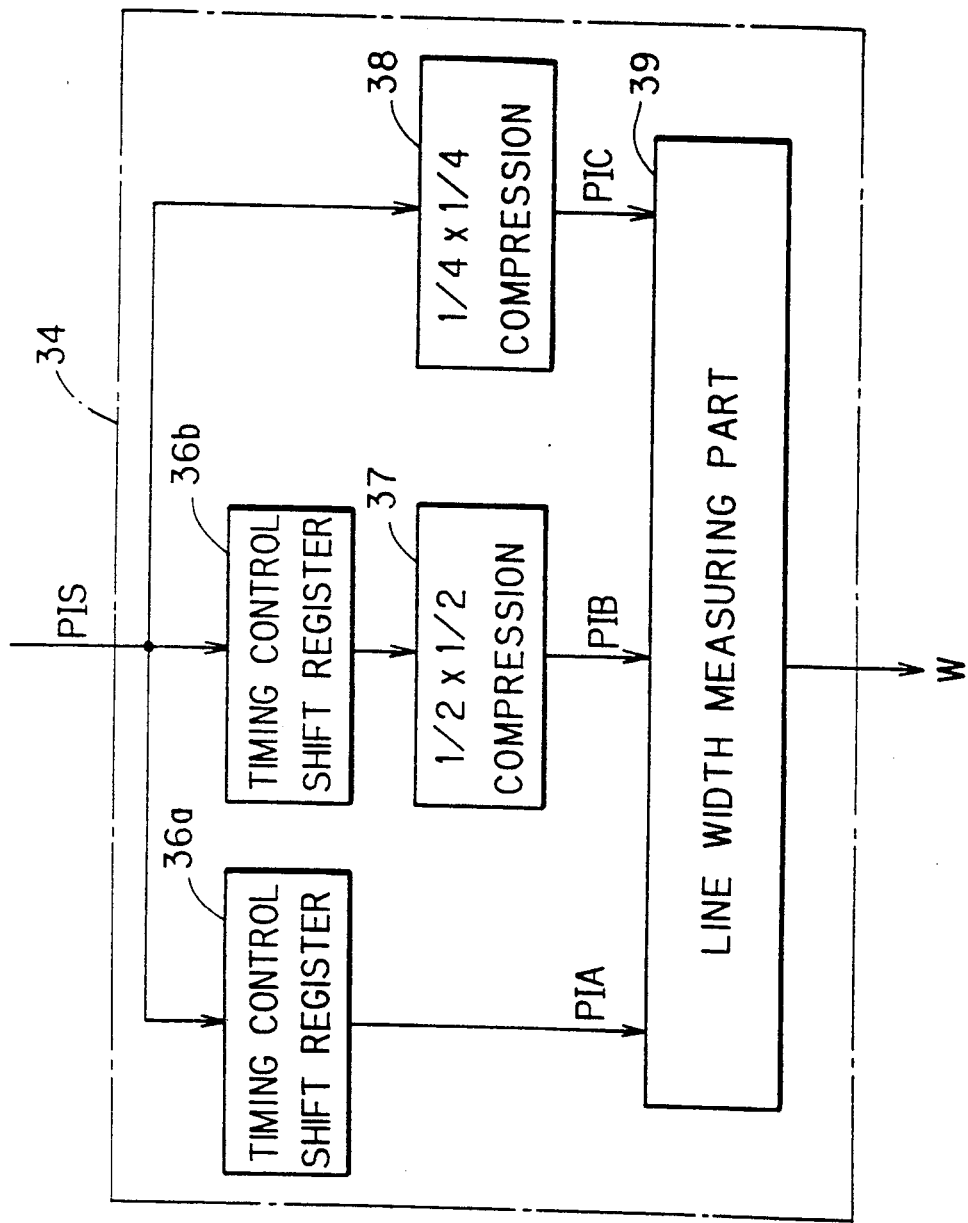
FIG. 1A is a block diagram showing the structure of a DRC circuit 34.
Figure 1B:
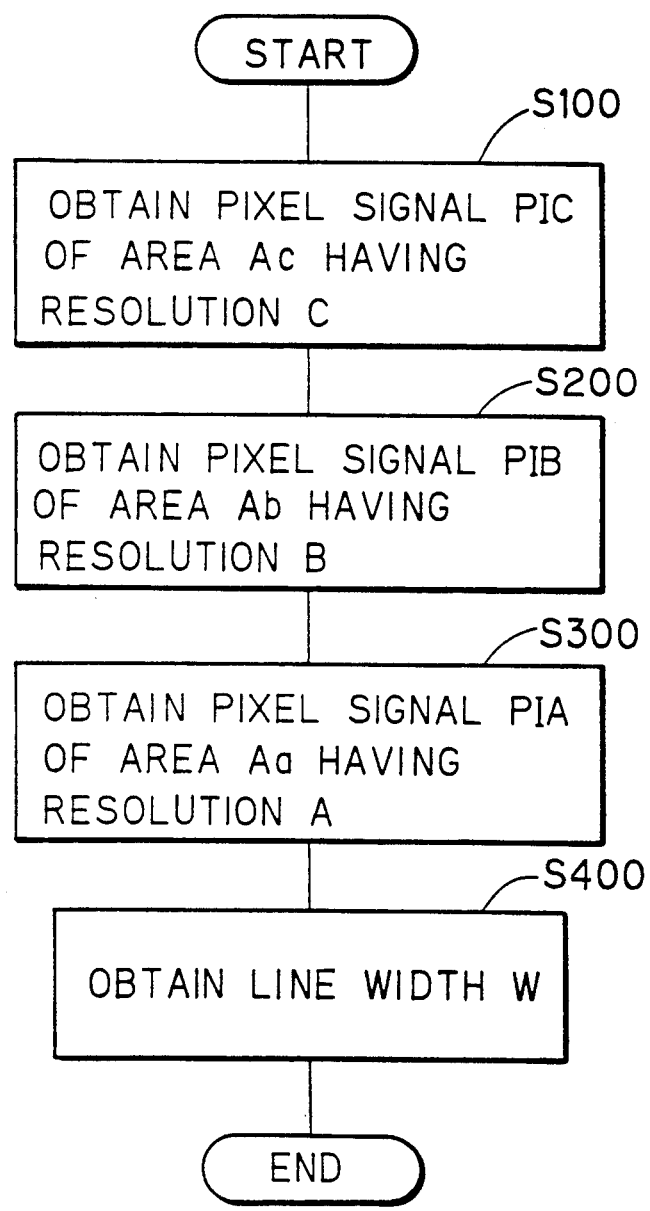
FIG. 1B is a flow chart showing flow of the operation of the DRC circuit 34.

FIG. 1A is a block diagram showing the outline of the DRC circuit 34, and FIG. 1B is a flow chart showing the flow of the operation of this circuit 34.

The pattern image signal PIS received in the DRC circuit 34 is inputted in timing control shift registers 36a and 36b and a $\frac{1}{4} \times \frac{1}{4}$ compression part 38 in parallel.

The $\frac{1}{4} \times \frac{1}{4}$ compression part 38 compresses image levels on each cluster of $4 \times 4$ pixels to an image level on a single pixel to thereby convert the pattern image signal PIS into a pixel signal PIC. The signal PIC represents respective image levels on coarse pixels in an area Ac (FIG. 5) having the coarsest resolution C. This operation corresponds to the process step S100 in FIG. 1B.

A $\frac{1}{2} \times \frac{1}{2}$ compression part 37 compresses image levels on each cluster of $2 \times 2$ pixels to an image level on a single pixel to thereby convert the pattern image signal PIS into a pixel signal PIB. The signal PIB represents respective image levels on coarse in an area Ab (FIG. 5) having the next coarsest resolution B. This operation corresponds to the process step S200 in FIG. 1B.

As to pixels on an area Aa having the finest resolution A, pixels included in the pattern image signal PIS are used as a pixel signal PIA with no compression. Namely, the resolution of the pattern image signal PIS is identical to the resolution A. This operation corresponds to the process step S300.

The timing control shift registers 36a and 36b perform delay processing for adjusting respective timings of the pixel signals PIA, PIB and PIC.

For example, in an arrangement of pixels corresponding to a pixel operator MOP (FIG. 6), which will be described later in more detail only a part of the high-resolution area Aa around the center O thereof is required, while a wider part of the area Ab encompassing the area Aa is required. Further, a still wider part of the area Ac encompassing the area Ab is required. Thus, the pixels of these areas must be adjusted to each other in space so that the operator MOP can measure line width W (see FIG. 7, for example).

Figure 5:
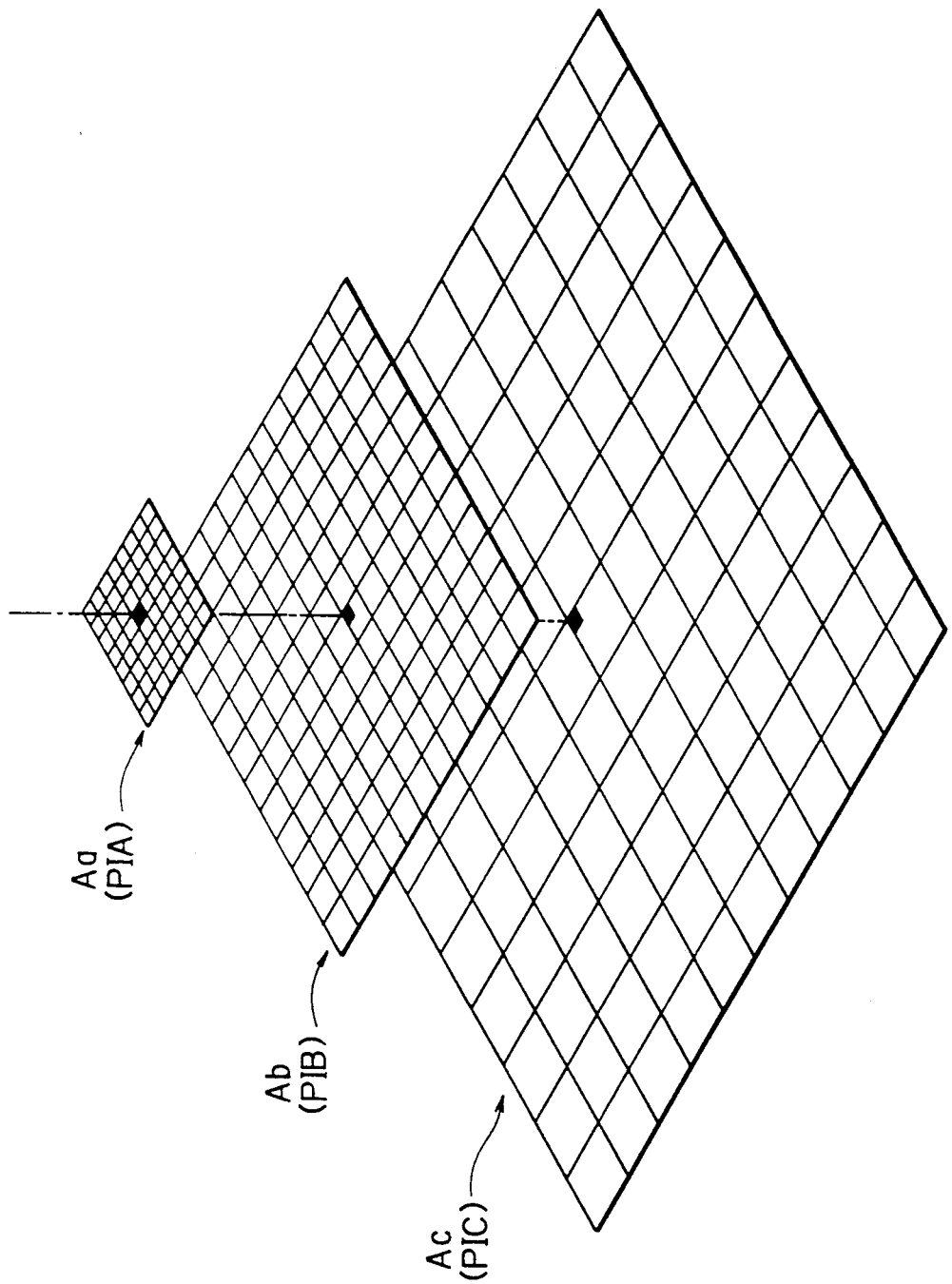
FIG. 5 is a conceptual diagram showing spatial arrangement of areas Aa, Ab and Ac.

FIG. 5 illustrates an example of the spatial arrangement of the areas Aa-Ac, where the pixel shown with a solid rhombus corresponds to the center O of the operator MOP. The areas Aa, Ab and Ac which are obtained by the signals PIA, PIB and PIC respectively are so arranged that respective center pixels are located at the center O. The shift registers 36a and 36b shown in FIG. 1A delay the signals PIA and PIB in order to obtain such spatial arrangement.

The signals PIA, PIB and PIC having the different resolutions are fed to a line width measuring part 39, so that the pixel operator MOP measures the width W of respective wiring lines (the process step S400).

Figure 6:
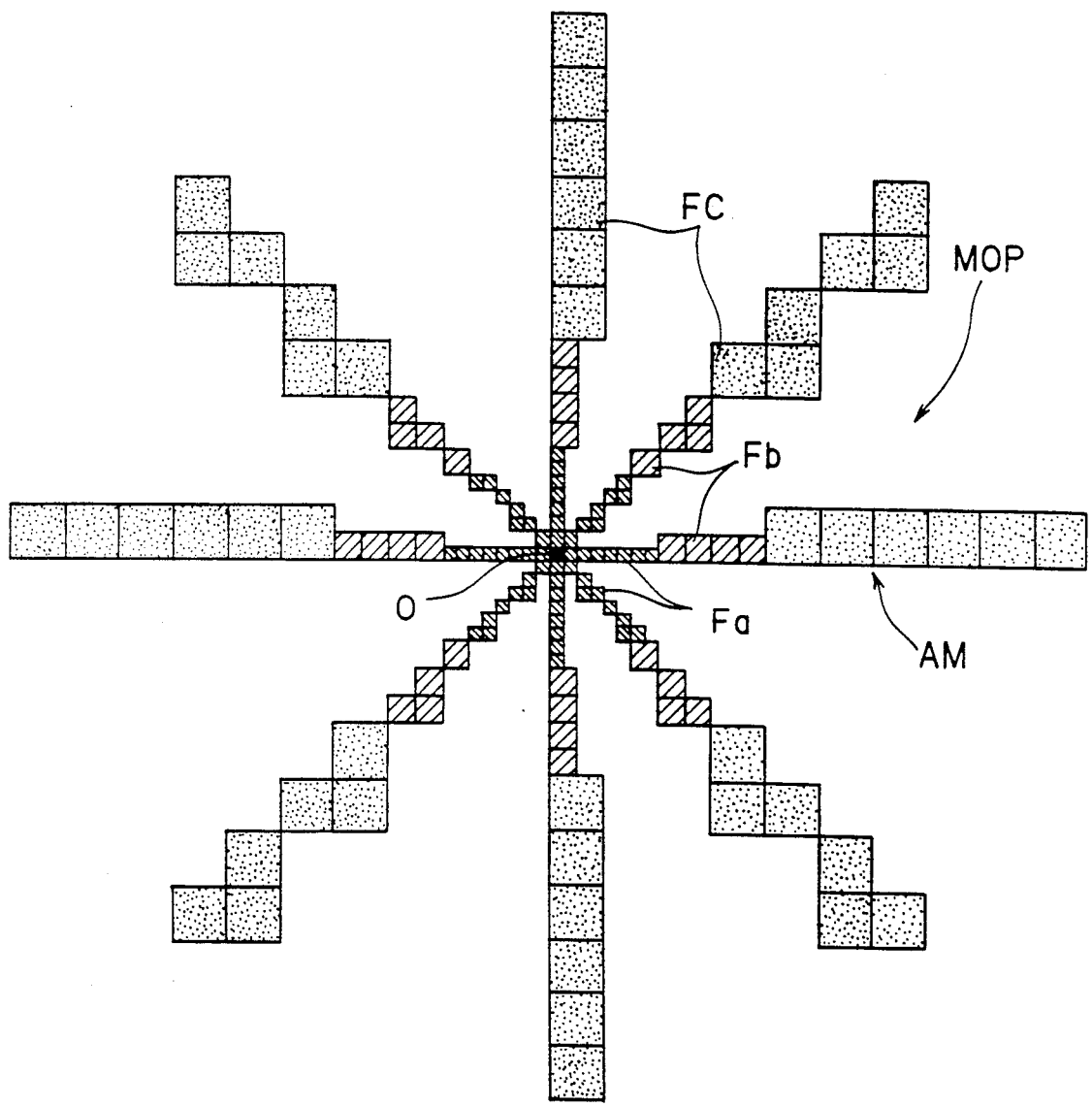
FIG. 6 illustrates an example of a pixel operator MOP.

FIG. 6 shows an example of the pixel operator MOP.

The operator MOP and the pattern image are relatively moved through image-scanning, and when the center O of the operator reaches a region on the line L, the width W of a line L is measured with the operator MOP.

Since high accuracy is required for measuring narrow lines, pixels Fa around the center O must be fine pixels corresponding to a high resolution. On the other hand, it is possible to attain an accuracy required for wide lines even if the resolutions are relatively low. Thus, pixels Fb and Fc of the operator MOP in portions distant from the center O are preferably made coarse to reduce the number of object pixels and to facilitate subsequent processings.

Therefore, the area Aa of the high resolution A is required only around the center O of the operator MOP, as described above. Although the portion of the area Ab of the resolution B required in the present operator is only the rectangular ring portion thereof surrounding the area Aa, the signal PIB on the whole of the area Ab is generated in the preferred embodiment to avoid a complex processing to generate the signal PIB only on the rectangular ring portion.

The widest area Ac is determined according to a similar rule and is defined to encompass the area Ab.

Figure 7:
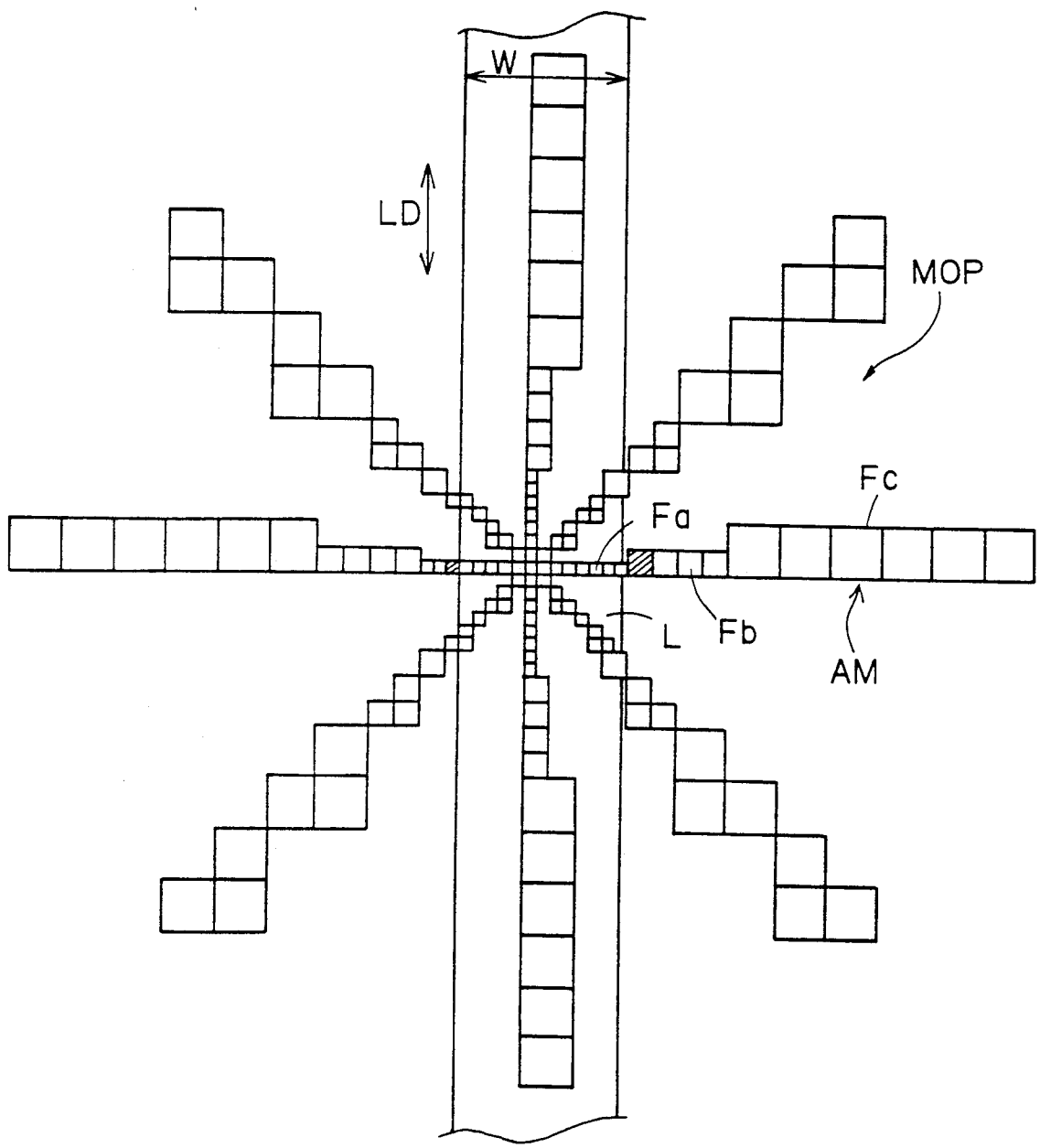
FIGS. 7 to 9 are conceptual diagrams showing the preferred embodiment of the present invention.
Figure 8:
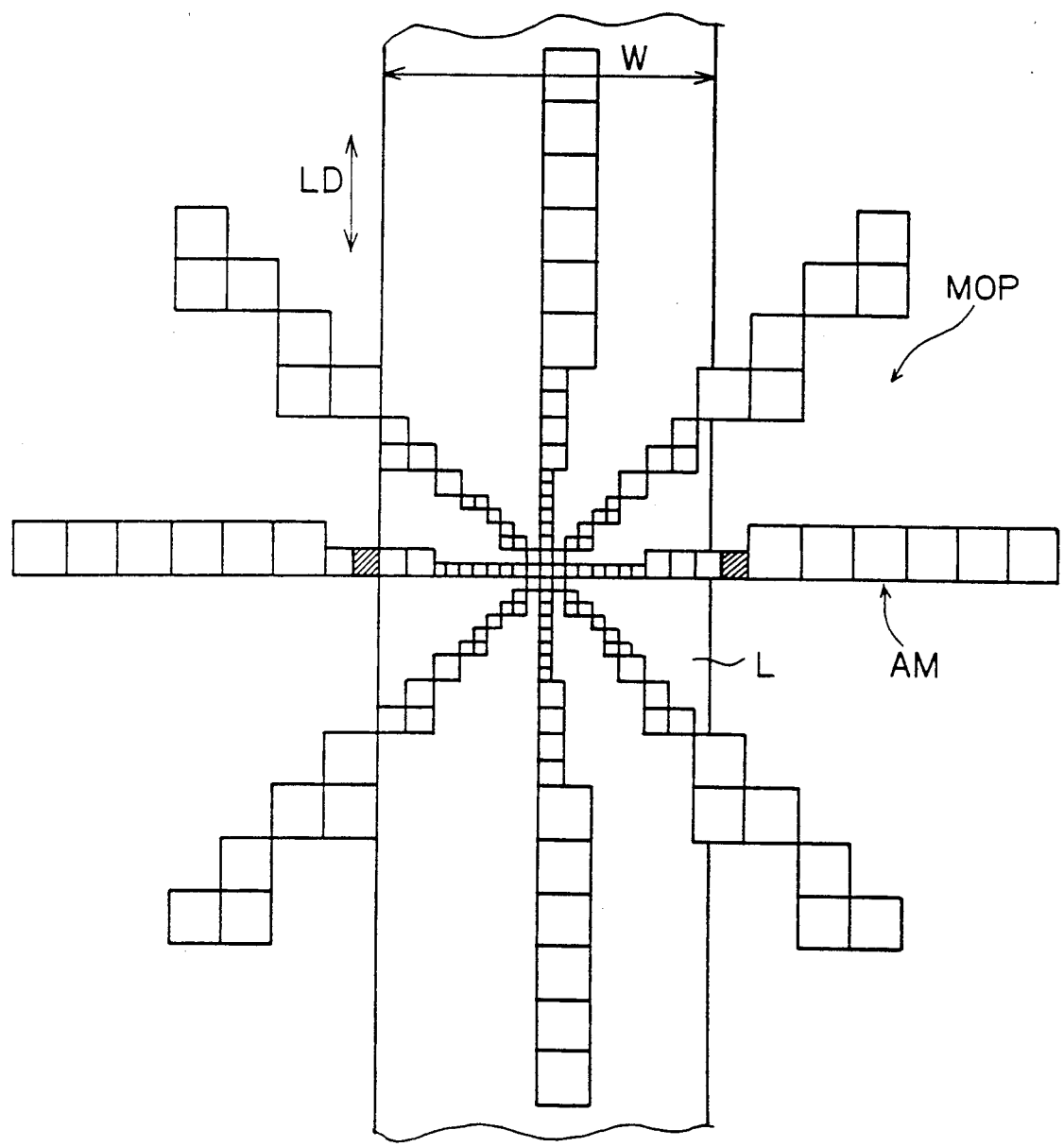
Figure 9:
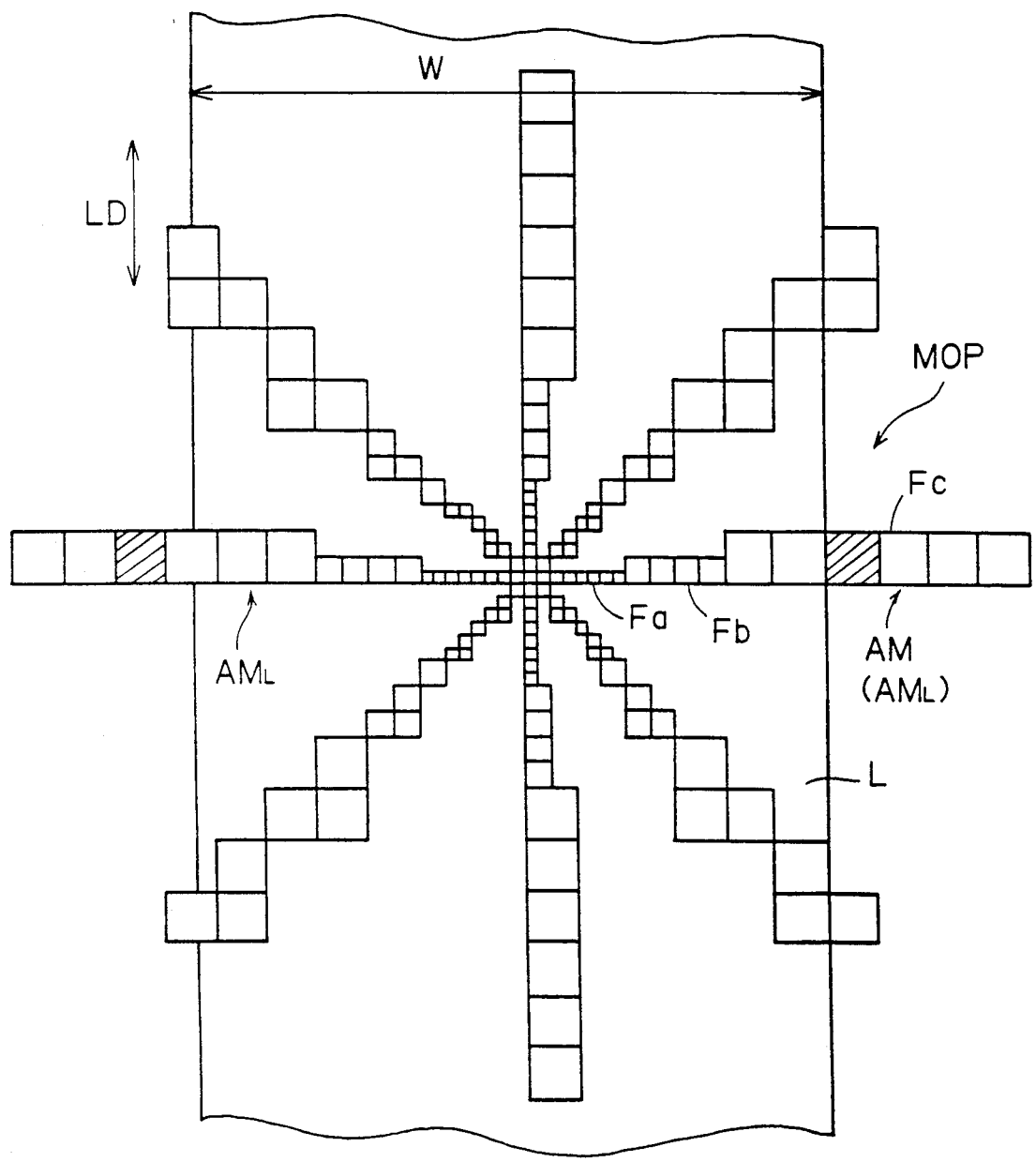

FIGS. 7, 8 and 9 show cases where the operator MOP is applied to respective lines L having width W of 100 μm, 200 μm and 400 μm, respectively. The pixels Fa, Fb and Fc in the operator MOP are assumed to be rectangulars having respective sides of 8 μm, 16 μm and 32 μm, respectively.

Referring to FIGS. 7 to 9, an arm AM of the operator MOP which is perpendicular to an elongated direction LD the lines L measures the line width. Namely, the distance between two pixels shown with oblique lines is obtained as the line width W. As described later in more detail, it is understood that the line width in FIGS. 7 to 9 is measured on the pixels Fa, Fb and Fc in the areas Aa, Ab and Ac, respectively.

(D-2) Compression of Pixels

Figure 10:
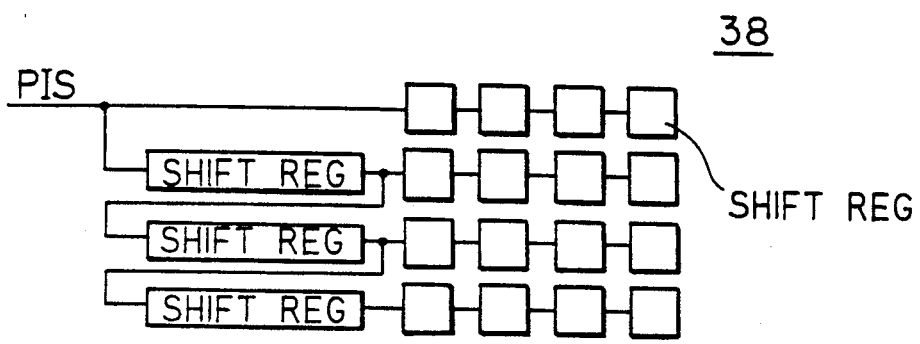
FIG. 10 is a block diagram of a compression part 38.

FIG. 10 shows the $\frac{1}{4} \times \frac{1}{4}$ compression part 38 in detail. The signal PIS is delayed in shift registers and respective levels thereof representing each cluster of $4 \times 4 = 16$ pixels are arranged into a two-dimensional array of levels, so that a majority decision is made among them. In the preferred embodiment, each cluster of pixels consists of $4 \times 4 = 16$ pixels which is an even number. Accordingly, the result of the majority decision may be "drawn" with eight pixels of "0" and eight pixels of "1", and in this case, the result of the decision is not defined. In order to avoid such an indefiniteness, the signal level for a cluster preceding to the subject cluster is also taken into consideration in the majority decision.

Figure 11:
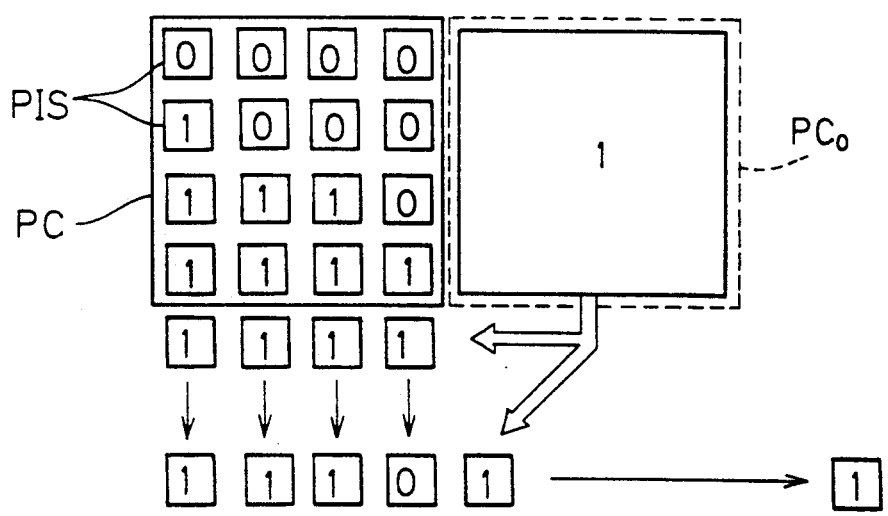
FIGS. 11 and 13 are conceptual diagrams showing a method of making a majority decision.

FIG. 11 shows an example of the modified majority decision. A pixel PC having a resolution C is obtained from 16 pixels of the pattern image signal PIS. As shown by void arrows, an already compressed pixel $PC_o$ preceding this pixel PC is also taken into consideration to avoid that the result of the decision becomes "drawn". More particularly, As shown by solid arrows, first majority decisions are made on the combination of respective binary image levels of pixels in each column and the binary value "1" for the pixel $PC_o$. The respective majority decisions never cause "drawn" result since each column consists of 5 pixels, i.e., an odd number of pixels. The value "1" of the pixel $PC_o$ is again added to four results (1, 1 1 and 0 here) obtained in the aforementioned manner to obtain binary five values, i.e., an odd number of values, and a second majority decision is made thereon. The value "1" is obtained for the pixel PC through the second majority decision on 1, 1, 1, 0 and 1.

Figure 12:
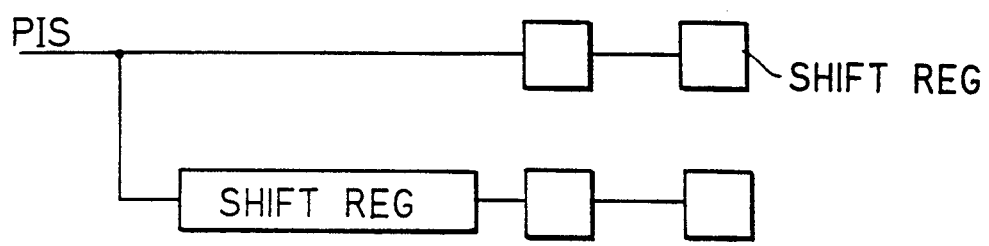
FIG. 12 is a block diagram of another compression part 37.
Figure 13:
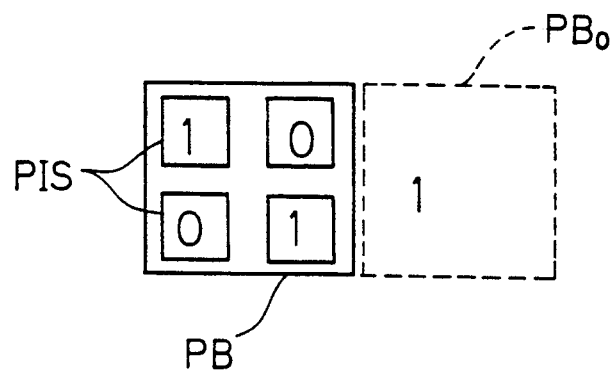

FIG. 12 shows the $\frac{1}{2} \times \frac{1}{2}$ compression part 37 in detail. Similarly to the $\frac{1}{4} \times \frac{1}{4}$ compression part 38, the signal PIS is delayed in shift registers and respective levels thereof representing each cluster of $2 \times 2 = 4$ pixels are arranged into a two-dimensional array of levels, so that a majority decision is made among them. Also in this case, "drawn" decision is avoided by modify the majority decision so as to include the binary level already obtained for a preceding compressed pixel $PB_o$, similarly to the case of the $\frac{1}{4} \times \frac{1}{4}$ compression part 38 (FIG. 13). A value "1" of the pixel $PB_o$ is added to four values 1, 0, 0 and 1 of the object pixels to make the modified majority decision, whereby "1" is obtained as the value of a compressed pixel PB.

(D-3) Superposition of Areas

The respective signals PIA, PIB and PIC obtained for the areas Aa, Ab and Ac are combined while adjusting respective positions of the areas Aa Ab and Ac, to thereby compose an array of pixel data corresponding to the operator MOP. This process requires a procedure conceptionally equivalent to superposition of the areas Aa, Ab and Ac pixels. In the preferred embodiment, the pattern image signal PIS is delayed in the timing control shift registers 36a and 36b (FIG. 1A) in parallel to obtain signals from which the pattern image signals PIB and PIC are generated. As already described, the signal PIA is generated without delaying the the pattern image signal PIS.

The following is detail of the superposing procedure of the areas Aa, Ab and Ac, where it is assumed that the areas Aa, Ab and Ac are matrices of Ma×Ma, Mb×Mb and Mc×Mc respectively in the unit of a pixel PA having the resolution A.

Figure 14:
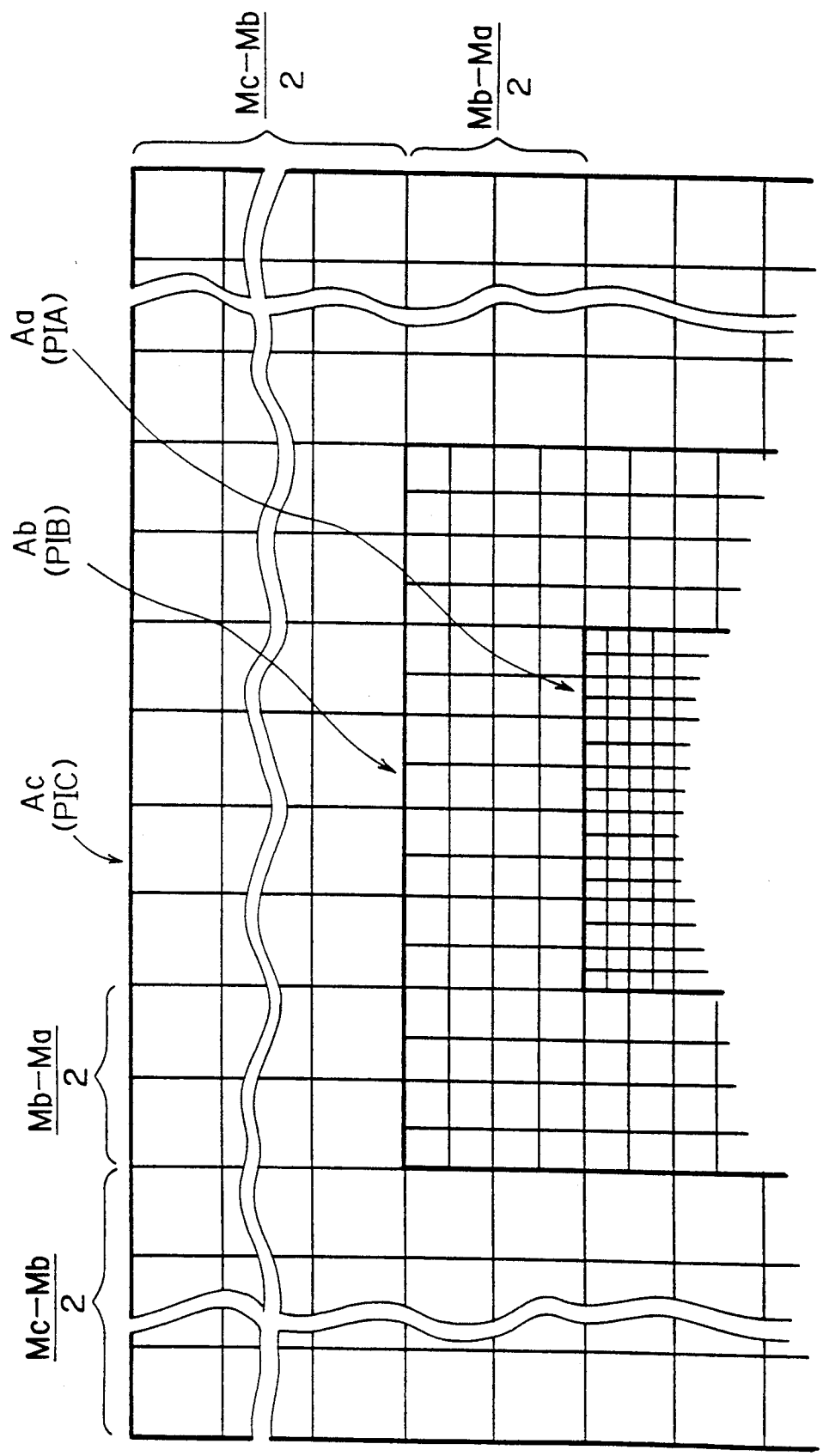
FIG. 14 is an explanatory diagram for obtaining amounts of delay.

The number of columns Ma of the area Aa is selected as a multiple of 4. For example, it is assumed that Ma=16. On the other hand, the number of the columns Mb of the area Ab is also a multiple of 4 since each side of the pixel PB having the resolution B is twice each side of the pixel PA, and it is assumed that Mb=32, for example. As shown in FIG. 14, the areas Aa and Ab are so arranged that the area Ab outwardly extends beyond the area Aa by ((Mb−Ma)/2) columns (=8 columns here). Since the numbers Ma, Mb and therefore (Mb−Ma) are multiples of 4, the number ((Mb−Ma)/2) is an integer.

Similarly, the number of columns Mc of the area Ac is also a multiple of 4 since each side of the pixel PC having the resolution C is four times each side of the pixel PA, and it is assumed that Mc=80, for example. When the area Ac is arranged in symmetry with respect to the areas Aa and Ab, therefore, the area Ac outwardly extends beyond the area Ab by ((Mc−Mb)/2) columns (=24 columns here). Since the numbers Mb, Mc and therefore (Mc−Mb) are multiples of 4, the number ((Mc−Mb)/2) is an integer.

An amount of delay conducted in the shift register 36a is determined as follows:

The first pixel in the area Aa spatially deviates from the first pixel in the area Ac by:

$$((Mc-Ma)/2) \text{ columns} + ((Mc-Ma)/2) \text{ pixels} \quad (1)$$

in the unit of the pixel PA. As described in (D-2), however, the pixel PC of the area Ac is obtained by compressing the pixel PA, and there is deviation of:

$$3 \text{ columns} + 3 \text{ pixels} \quad (2)$$

in time from the corresponding pixel PA. Hence, as the result, $$((Mc-Ma)/2+3) \text{ columns} + ((Mc-Ma)/2+3) \text{ pixels} = (Mc+1) \times ((Mc-Ma)/2+3) \text{ pixels} \quad (3)$$

are required as the delay time.

Similarly, the amount of the delay in the shift register 36b for obtaining the pixel PB is determined from the value:

$$((Mc-Mb)/2 \div 3) \text{ columns} + ((Mc-Mb)/2+3) \text{ pixels} \quad (4)$$

in the unit of the pixel PA. Since the pixel PB is a compressed pixel and is deviated in time from the pixel PA by:

$$1 \text{ column} + 1 \text{ pixel} \tag{5}$$

and therefore, the delay corresponding to the expression (5) is cancelled in the expression. As a result, the amount of delay in the shift register 36b is obtained as:

$$((Mc-Mb)/2+2) \text{ columns} + ((Mc-Mb)/2+2) \text{ pixels} = (Mc+1) \times ((Mc-Mb)/2+2) \text{ pixels} \tag{6}$$

(D-4) Measurement of Line Width

Figure 15:
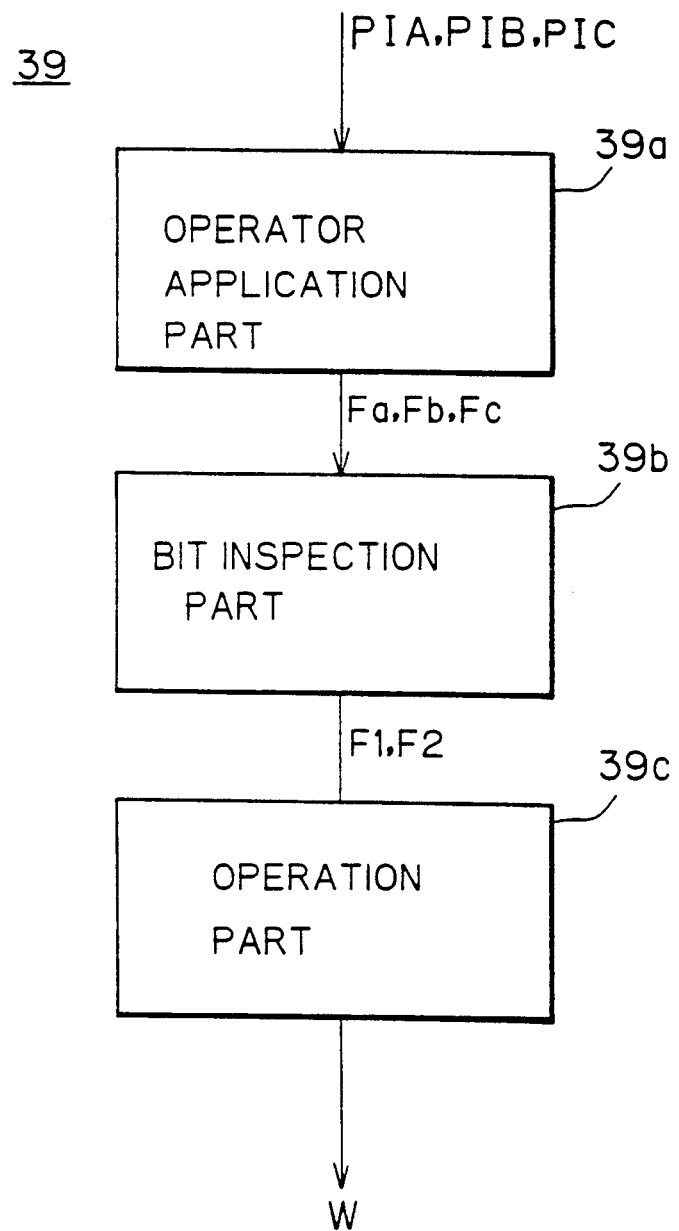
FIG. 15 is a block diagram showing the structure of a line width measuring part 39.
Figure 16:
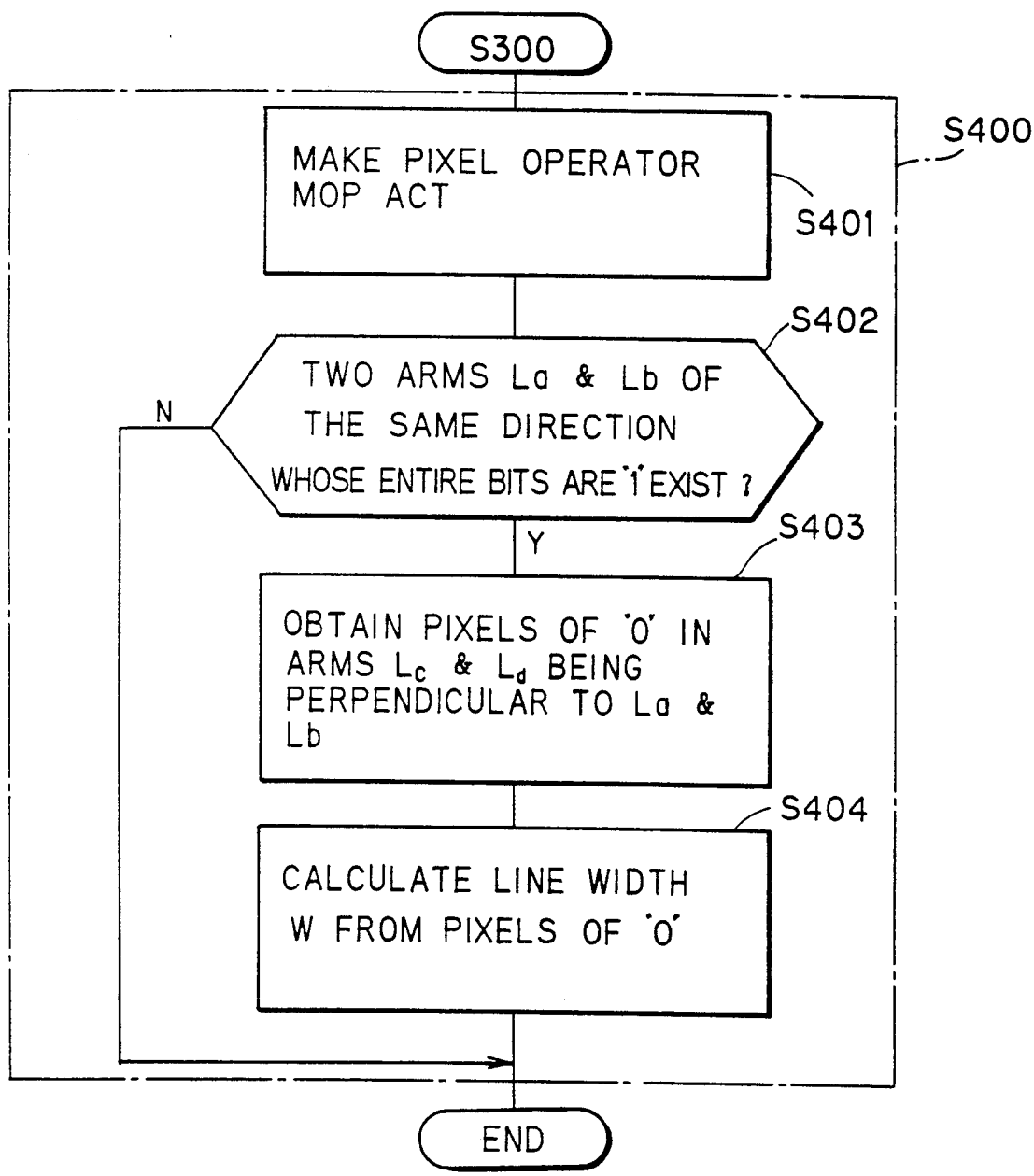
FIG. 16 is a flow chart showing the operation of the line width measuring part 39.

FIG. 15 is a block diagram showing the structure of the line width measuring part 39. FIG. 16 is a flow chart showing the operation of this part 39, with detail of the process step S400 shown in FIG. 1B.

Figure 17:
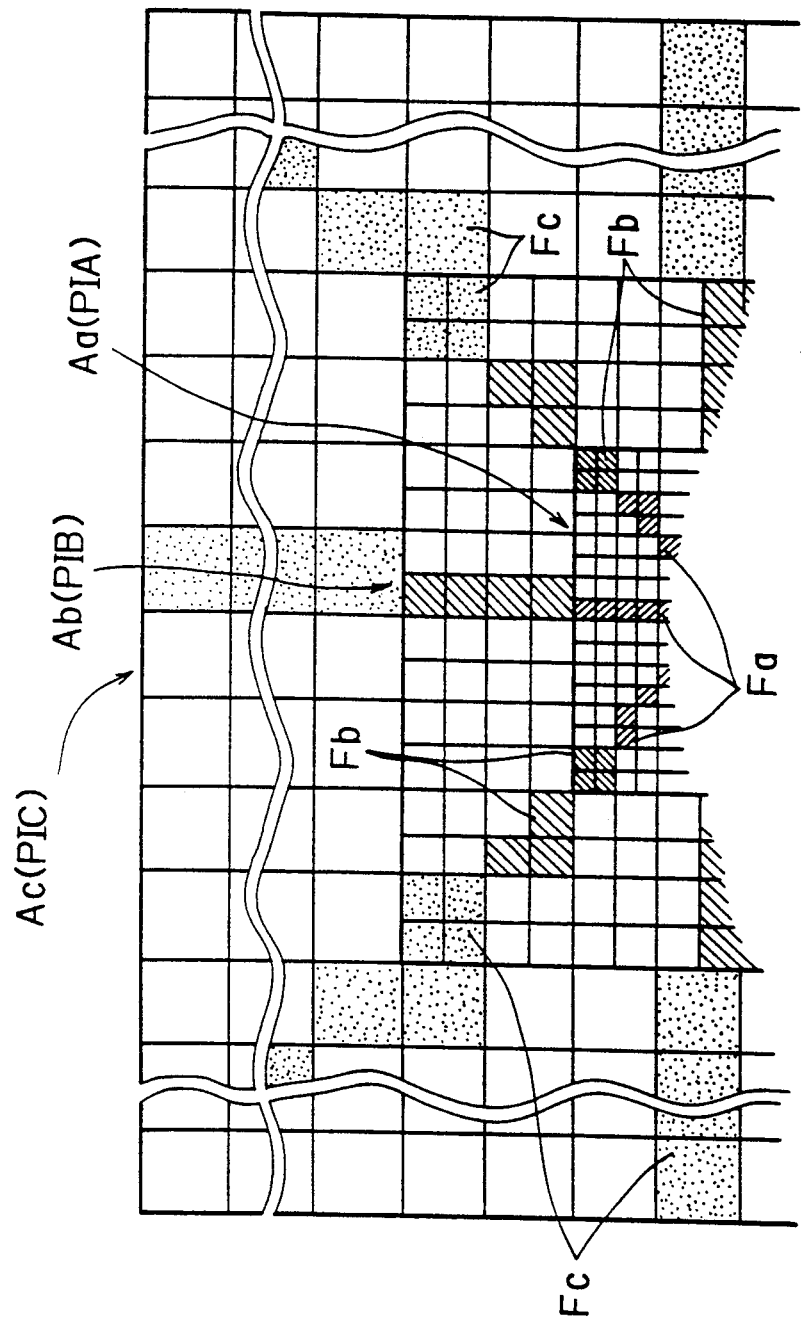
FIGS. 17 and 18 are conceptual diagrams showing the preferred embodiment of the present invention.

First, the pixel operator MOP is applied to the areas Aa, Ab and Ac by an operator application part 39a. That is, respective parts of the image signals PIA-PIC corresponding to the pixels Fa-Fc overlapping the areas Aa-Ac are specified and extracted to obtain resultant data consisting of a plurality of image levels on the operator MOP. FIG. 17 illustrates a part of the resultant data. Pixels Fa, Fb and Fc have resolutions A, B and C respectively. As illustrated In FIG. 6, the operator MOP has a plurality of radial arms and is such that resolutions on the respective arms becomes coarse as separated from the center of the operator MOP. In the preferred embodiment, the boundary between the fine pixels Fa and the coarse pixels Fb does not form a rectangle but form an approximate circle. Similarly, the boundary between the coarse pixels Fb and the most coarse pixels Fc does not form a rectangle but form an approximate circle. Hence, as shown in FIG. 17, part of the pixels Fc located at the respective corners of the area Ab are included in the pixels constituting the operator MOP, although these corner pixels belong to the area Ab. Because of the same reason, The part of the pixels Fb located at the respective corners of the area Aa are included in the pixels constituting the operator MOP.

A bit inspection part 39b examines whether values of pixels subjected to the operator MOP are "0" or "1", to decide whether there exist two arms La and Lb (FIG. 18) aligned in the same direction and whose all of the bits are "1" (the process step S402). When the operator MOP is on a line L, all values of pixels Fa, Fb and Fc of arms which are parallel to the elongated direction LD of the line L are "1", as understood from FIGS. 7 to 9 and 18. Accordingly, when two arms aligned in the same direction and whose all of the bits are "1" are found, it is concluded that the line L extends in a direction parallel to the two arms. When there exist no arms satisfying this condition, no calculation of the line width W is performed.

The process of determining whether there are the two arms La and Lb satisfying the aforementioned condition may be conducted by delivering respective signal levels of pixels on each pair of aligned arms to an AND gate circuit.

Figure 18:
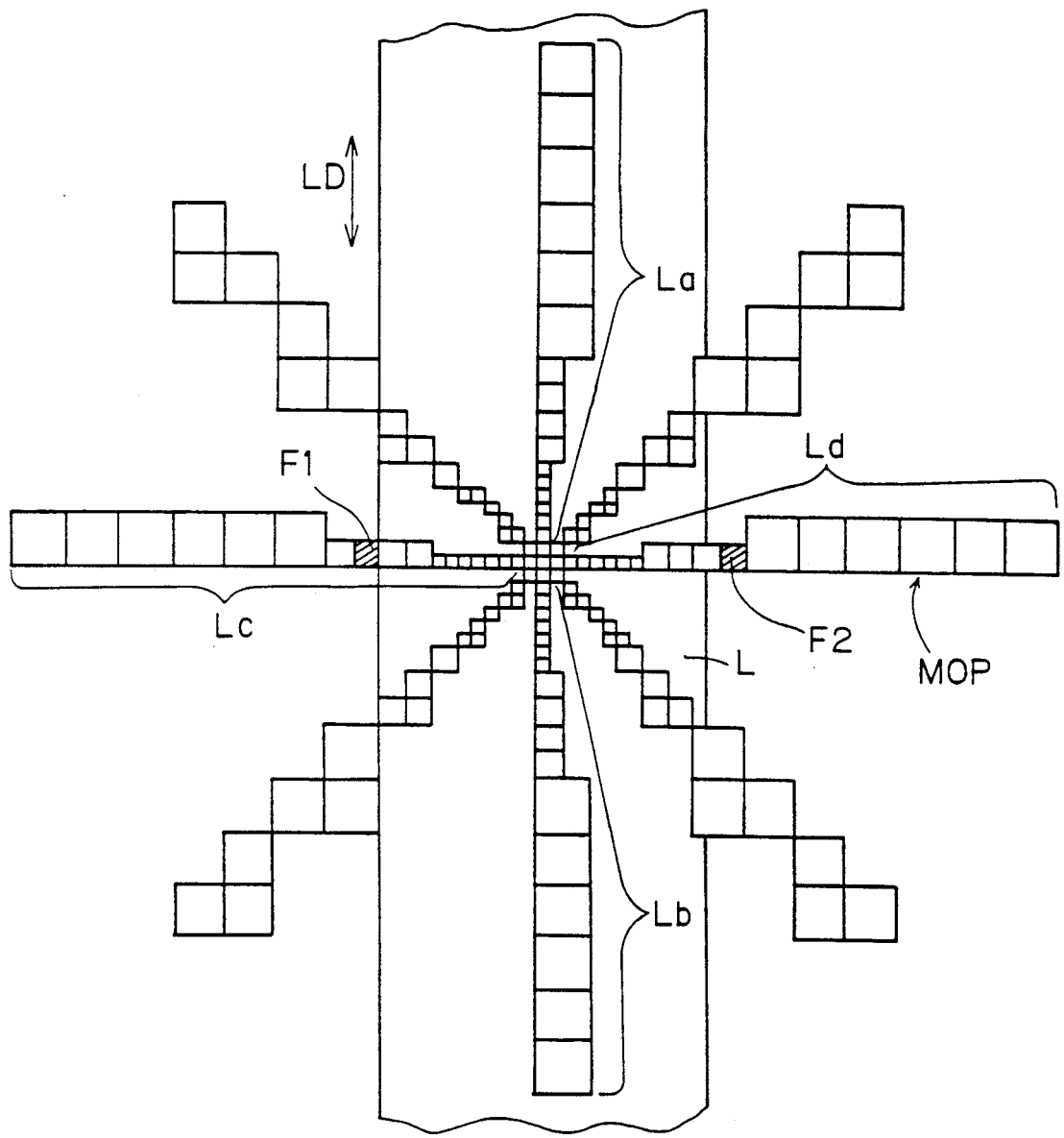
Figure 19:
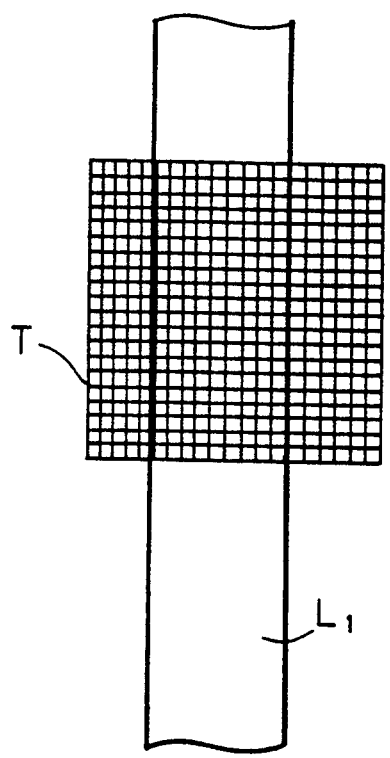
FIGS. 19 and 20 are conceptual diagrams showing pixel matrixes.
Figure 20:
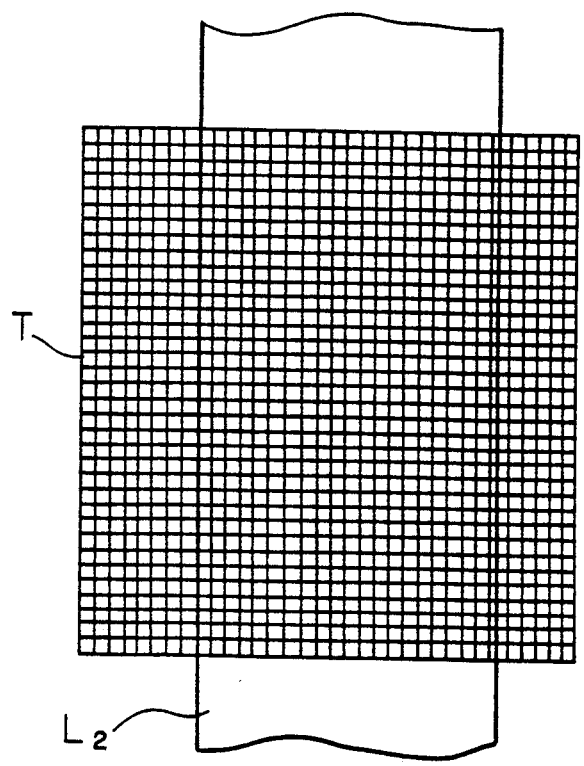

The bit inspection part 39b further performs a preliminary process step for measurement of the line width (the process step S403). Namely, when the pair of arms La and Lb satisfying the aforementioned condition (hereinafter called as "the on-the-line arms") is recognized, a pair of arms Lc and Ld perpendicular to the on-the-line arms are specified and are subjected to the following process of determining the line width. Since portions around centers of the arms Lc and Ld are on the line L, values of pixels on the arms Lc and Ld around the centers are "1". In portions separated from the centers, however, some of the pixels of the arms Lc and Ld are out of the line L and have a value of "0". Referring to FIG. 18 which illustrates the similar case as in FIG. 8, the arms La and Lb are in the elongated direction LD of the line L, while arms Lc and Ld are perpendicular thereto. Among pixels of the arms Lc and Ld, all of pixels located between pixels $F_1$ and $F_2$ are "1". On the other hand, the data levels are "0" on the other pixels of the arms Lc and Ld which are located out of the line L and include the pixels $F_1$ and $F_2$. Hence, the distance between the pixels $F_1$ and $F_2$ is employed as the line width. The bit inspection part 39b generates a signal representing the positions or addresses of the pixels $F_1$ and $F_2$ and transmits the same to an operation part 39c.

The operation part 39c calculates the line width W from the signal representing the positions of the pixels $F_1$ and $F_2$. Both of the pixels $F_1$ and $F_2$ belong to pixels Fb of the resolution B in the case of FIG. 18. Hence, it is determined that the line width W is larger than the length of a straight pair of pixel chains consisting of the pixels Fa of the resolution A. Namely, in the example shown in FIG. 18, it is determined that the line width is larger than:

$$8 \; \mu m \times 16 = 128 \; \mu m \tag{7}$$

The pixel $F_1$ is the third one from the inner side among the pixels Fb in the arm Lc. In other words, the pixels Fb are "1" up to the second one from the inner side within the arm Lc. Through a similar analysis, it is determined that the pixels Fb are "1" up to the third one from the inner side within the arm Ld. Hence, a value:

$$16 \; \mu m \times (2+3) = 80 \; \mu m \tag{8}$$

is added to the length 128 $\mu$m indicated in the expression (7), to obtain:

$$128 \; \mu m + 80 \; \mu m = 208 \; \mu m \tag{9}$$

as the line width W.

In the case shown in FIG. 7, the line width W in the following expression (10) is obtained only through a calculation on the pixels Fa.

$$8 \; \mu m \times 13 = 104 \; \mu m \tag{10}$$

In the case of FIG. 9, the full length of respective chains of pixels Fa and Fb in the lateral arms $AM_L$ are on the line L, and the sum thereof is:

$$(8 \; \mu m \times 16) + (16 \; \mu m \times 8) = 256 \; \mu m \tag{11}$$

The number of continuous pixel chains Fa included in the arms $AM_L$ and having the value of "1" are counted and, from the result thereof and the value (11), the line width W is obtained as:

$$256 \; \mu m + 32 \; \mu m \times 5 = 416 \; \mu m \tag{12}$$

In any case, the error in determining the line width W is +4% as compared with true line width and causes no problem.

As described above, the pixel operator MOP can accurately measure the line width W, since the length of continuous chains of pixels having a lower resolution than that of pixels around the boundary of the line is included in the result of the calculation as an offset value.

E. Modifications (1) The number of pixel-size types included in each arm may be any plural number and is preferably determined depending on the range of the line width provided on printed boards to be inspected.

(2) The respective resolutions on the operator may be increased at arbitrary ratios from the center of the operator to the respective ends of the arms.

(3) The $\frac{1}{2} \times \frac{1}{2}$ compression part 37 may be provided in a front stage of the timing control shift register 36b. In this case, the structure of the shift register 36b can effectively be simplified since the number of pixels to be controlled by the shift register 36b is reduced.

(4) Each of the signals PIB and PIC may be obtained by extracting a single pixel from each cluster of pixels and by employing the signal value of the extracted pixel as the compressed value.

Figure 21:
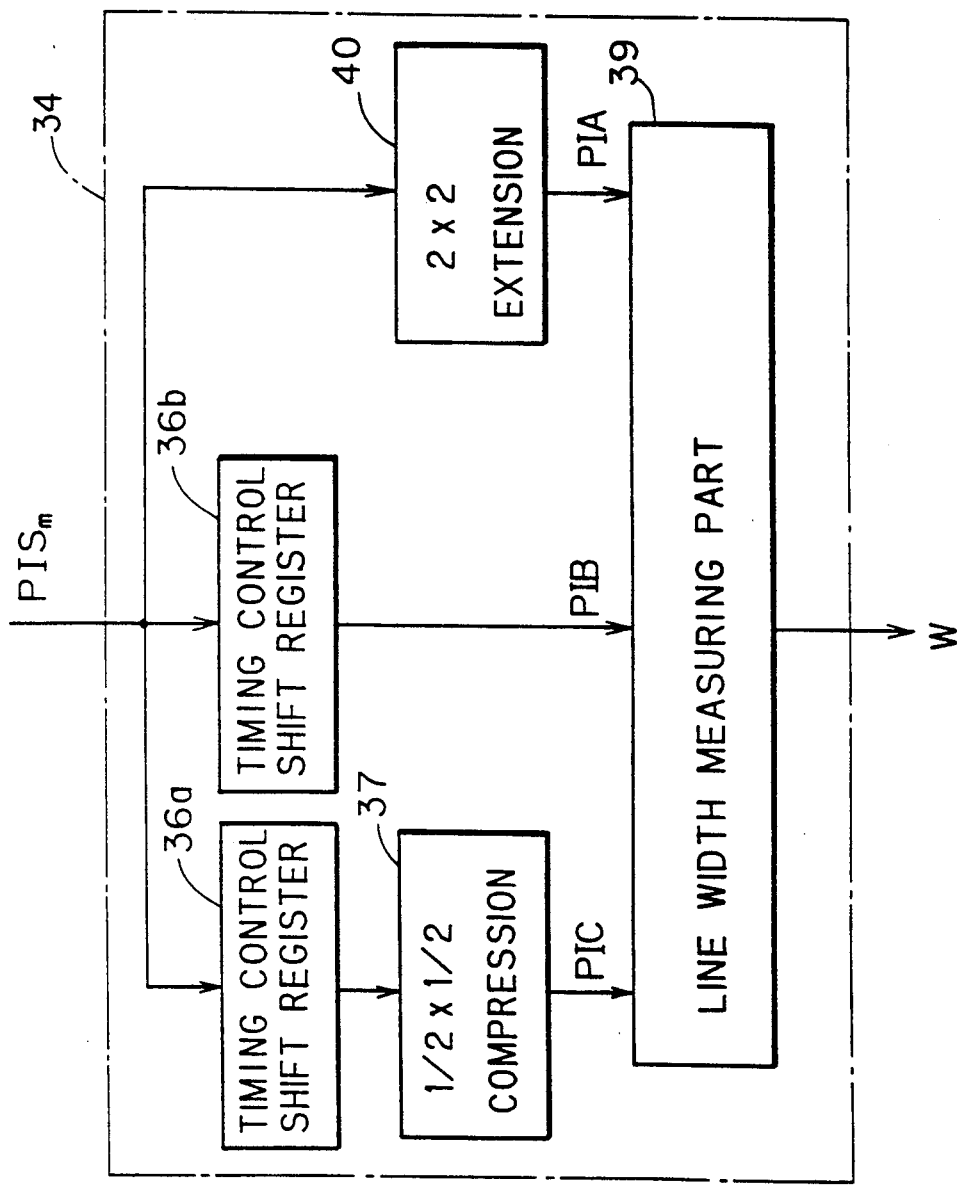
FIG. 21 is a block diagram showing another preferred embodiment of the present invention.

(5) At least one of the respective sizes of the pixels Fa, Fb and Fc may be smaller than the size of each pixel in the pattern image PIS. For example, a DRC circuit 34 shown in FIG. 21 comprises a $\frac{1}{2} \times \frac{1}{2}$ compression part 37 and a 2×2 extension part 40. The 2×2 extension part 40 is operable to obtain four pixels from each pixel to increase the resolution of the pixels in the central region of the operator MOP. The operation in the 2×2 extension part 40 is as follows:

As already described, the pattern image PI is binarized in the binarizing circuit 21b with the threshold value TH2. Alternatively, when the pattern image PI is quantized with a plurality of different threshold values TH2, a pattern image PIm having gradation can be obtained. The pattern image signal PISm having gradation is subjected to interpolation processing in the 2×2 extension part 40.

Figure 22:
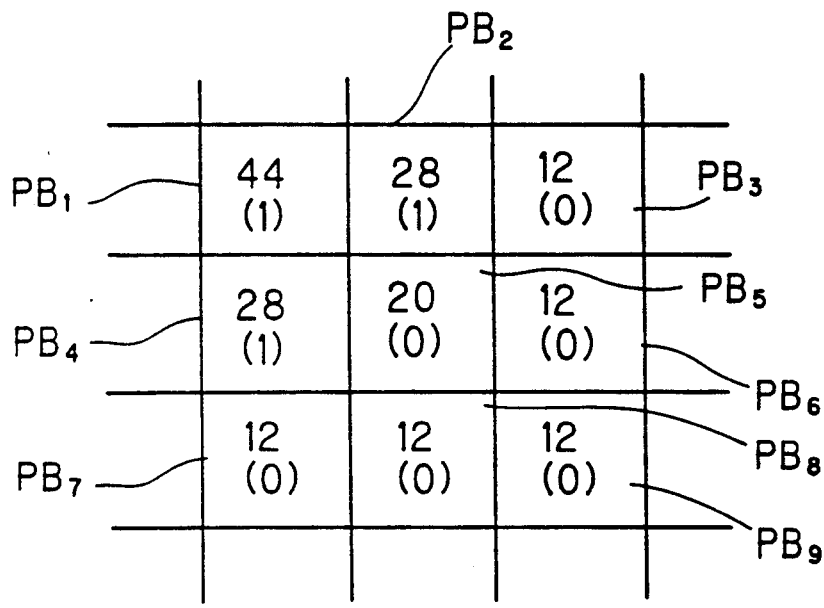
FIGS. 22 to 24 are conceptual diagrams showing an interpolation method.
Figure 23:
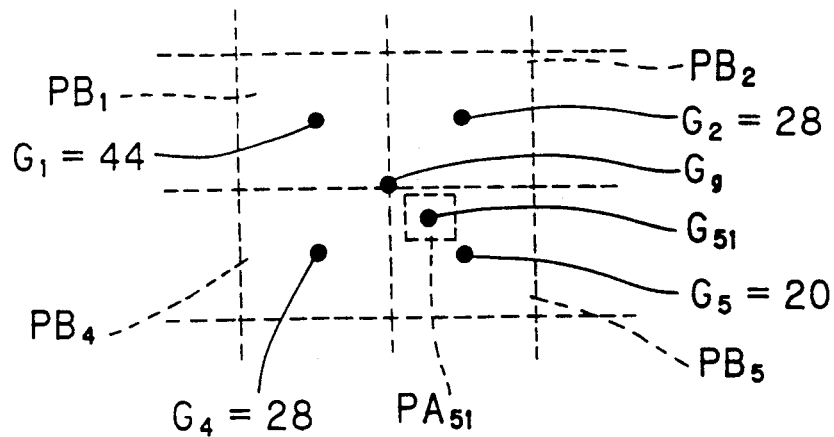
Figure 24:
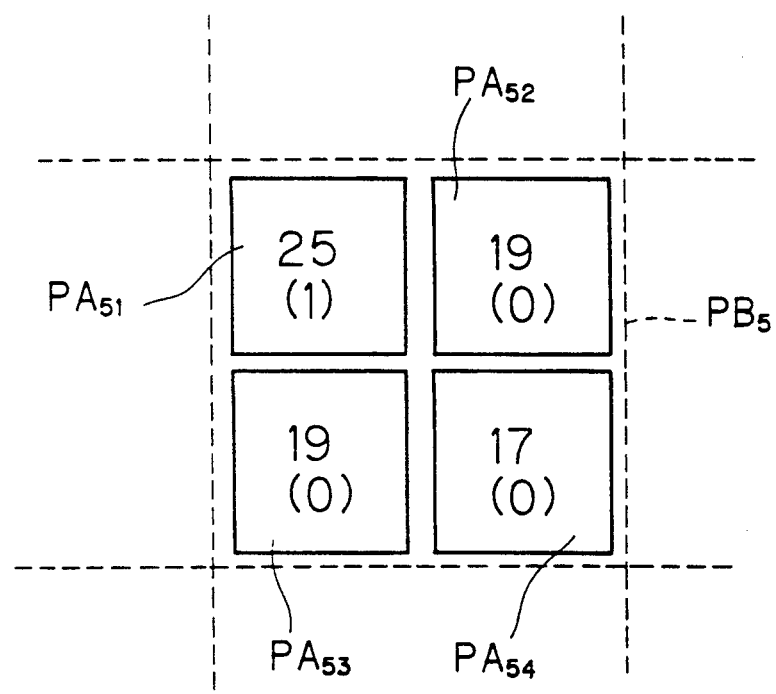

FIGS. 22 to 24 are conceptual diagrams illustrating the interpolation processing. A process of interpolating a pixel PB$_5$ shown in FIG. 22 is as follows:

The pixel PB$_5$ is surrounded by pixels PB$_1$, PB$_2$, PB$_3$, PB$_4$, PB$_6$, PB$_7$, PB$_8$ and PB$_9$ adjacent thereto. The spatial resolution of these pixels is equal to that of the pattern image signal PISm having gradation. In FIG. 22, numbers 12, 20, ... denote quantized gradation levels of the pattern image signal PISm.

Consider that the value of the pattern image signal PISm on each pixel is a weight at the center of each pixel. FIG. 23 shows weights G$_1$, G$_2$, G$_4$ and G$_5$ of respective pixels PB$_1$, PB$_2$, PB$_4$ and PB$_5$. A weight at the boundary point of the four pixels PB$_1$, PB$_2$, PB$_4$ and PB$_5$ is defined as the following expression (13) from the mean value of these four weights G$_1$, G$_2$, G$_4$ and G$_5$.

$$G_g = (G_1 + G_2 + G_4 + G_5)/4 = 30 \tag{13}$$

Increase of the resolution is attained by dividing the pixel PB$_5$ into four pixels PA$_{51}$, PA$_{52}$, PA$_{53}$ and PA$_{54}$, and the gradation level of the pixel PA$_{51}$, for example, is obtained by interpolating the weights G$_g$ and G$_5$ as:

$$G_{51} = (G_g + G_5)/2 = 25 \tag{14}$$

The gradation levels of other pixels PA$_{52}$, PA$_{53}$ and PA$_{54}$ are also obtained through a similar procedure.

The respective gradation levels of pixels thus obtained are binarized with a threshold value to generate a patter image signal having higher resolution than the pattern image signal PISm.

The parenthesized "0" or "1" shown in FIGS. 22 and 24 denote results of the case where the pattern image signal PISm is binarized with a threshold value TH2=24. A value of the noted pixel PB$_5$ after binarization is "0". The pixel PB$_5$ having a binary value "0" is divided into the pixels PA$_{51}$, PA$_{52}$, PA$_{53}$ and PA$_{54}$ having values "1", "0", "0" and "0" respectively, and the resolution can be improved by interpolation.

While the invention has been shown and described in detail, the foregoing description is in all aspects illustrative and not restrictive. It is therefore understood that numerous modifications and variations can be devised without departing from the scope of the invention.

We claim:

1. A method of inspecting the width of a wiring line formed on a printed board, comprising the steps of:
   (a) obtaining an image of said wiring pattern;
   (b) applying an operator to said image of said wiring pattern to obtain a set of data values, wherein resolution in a center portion of said operator is higher than resolution in peripheral portion of said operator; and
   (c) calculating the width of said wiring line as a function of said set of data values;
   the step (b) comprising the steps of:
   (b-1) defining said operator such that:
   said operator has:
   a first set of pixels located in said center portion of said operator; and
   a second set of pixels located around said first set of pixels;
   in which each pixel belonging to said first set of pixels is smaller than each pixel belonging to said second set of pixels; and
   (b-2) applying said operator to said image of said wiring line while adjusting respective positions of said operator to said imaging of said wiring line.

2. The method of claim 1, wherein
   the step (b-1) comprises the step of:
   (b-1-1) defining said operator such that:
   said operator has a plurality of arms extending from a center pixel of said operator;
   each of said plurality of arms has first and second chains of pixels which correspond to said first and second sets of pixels, respectively, and which are successibly connected; and
   each pixel belonging to said first chain of pixels has a first size smaller than a second size of each pixel belonging to said second chain of pixels.

3. The method of claim 2, wherein
   the step (b-2) comprises the steps of:
   (b-2-1) obtaining a first set of image levels defined on a first matrix array of first pixels as a function of said image of said wiring pattern, in which each of said first pixels has said first size;
   (b-2-2) obtaining a second set of image levels defined on a second matrix array of second pixels as a function of said image of said wiring pattern, in which each of said second pixels has said second size;

(b-2-3) extracting image levels on said first chain of pixels from said first set of said image levels;

(b-2-4) extracting image levels on said second chain of pixels from said second set of said image levels; and (b-2-5) combining respective image levels on said first and second chains of pixels with each other to obtain said set of data values.

4. The method of claim 3, wherein the step (b-2-2) comprises the steps of:

(b-2-2-1) defining an array of pixel clusters on said image of said wiring pattern;

(b-2-2-2) uniting respective pixels in each of said pixel clusters to obtain an array of united pixels; and (b-2-2-3) compressing respective image levels on said respective pixels in each of said pixel clusters to provide an compressed image level to each united pixel belonging to said array of united pixels, thereby obtaining said second set of image levels defined On said second matrix array Of second pixels.

5. The method of claim 4, wherein the step (b-2-2-3) comprises the step of:

(b-2-2-1) applying a majority decision to respective image levels on said respective pixels in each of said pixel clusters to obtain said compressed image level.

6. The method of claim 5, wherein the step (b-2-2-1) comprises the step of:

defining said array of pixel clusters such that each pixel cluster consists of an even number of pixels; and the step (b-2-2-4) comprises the step of:

obtaining a first compressed image level for a first pixel cluster belonging to said array of pixel clusters;

combining said first compressed image level with said respective image levels for a second pixel cluster adjacent to said first pixel cluster in said array of pixel clusters, to thereby obtain an odd number of image levels; and applying said majority decision to said odd number of image levels to obtain a second compressed image level for said second pixel cluster.

7. The method of claim 3, wherein the step (b-2-1) comprises the steps of:

dividing each original pixel on said image of said wiring pattern into a plurality of divided pixels; and interpolating said image of said wiring pattern to provide an interpolated image level to each of said plurality of divided pixels, thereby obtaining said first set of image levels defined on said first matrix array of first pixels.

8. An apparatus for inspecting the width of a wiring line formed on a printed board, comprising:

(a) means for obtaining an image of said wiring pattern;

(b) means for applying an operator to said image of said wiring pattern to obtain a set of data values, wherein resolution in a center portion of said operator is higher than resolution in peripheral portion of said operator; and (c) means for calculating the width of said wiring line as a function of said set of data values;

the means (a) comprising:

(a-1) means for obtaining said image of said wiring pattern in the form of first image levels defined on a first matrix array of first pixels each having a first pixel size;

the means (b) comprises:

(b-1) means for converting said first matrix array of first pixels into:

a second matrix array of second pixels each having a second pixel size; and a third matrix array of third pixels each having a third pixel size, in which said second pixel size is smaller than said third pixel size;

(b-2) means for converting said first image levels into second image levels and for providing said second image levels to said second pixels on said second matrix array;

(b-3) means for converting said first image levels into third image levels and for providing said third image levels to said third pixels on said third matrix array; and (b-4) means for combining a part of said second image levels with apart of said third image levels to obtain said set of data values.

9. The apparatus of claim 8, wherein the means (b-4) comprises:

(b-4-1) means for obtaining respective reference pixels on said second and third matrix arrays each corresponding to a center pixel of said operator;

(b-4-2) means for extracting said part of said second image levels from a portion of said second matrix array including said reference pixel of said second matrix array;

(b-4-3) means for extracting said part of said third image levels from a ring portion of said third matrix array surrounding said reference pixel of said third matrix array, in which said portion of said second matrix array is surrounded by said ring portion of said third matrix array; and (b-4-5) combining said part of said second image levels with said part of said second image levels to obtain said set of data values.

10. The apparatus of claim 9, wherein said operator has a plurality of arms extending from a center pixel of said operator;

each of said plurality of arms has first and second chains of pixels which are successibly connected;

the means (b-4-2) comprises:

(b-4-2-1) means for extracting said part of said second image levels from a part of said second pixels overlapping said first chain of pixels; and the means (b-4-3) comprises:

(b-4-3-1) means for extracting said part of said third image levels from a part of said third pixels overlapping said second chain of pixels.

11. The apparatus of claim 10, wherein the means (a-1) comprises:

(a-1-1) means for expressing said first image levels in the form of a first image signal for each first pixel;

the means (b-2) comprises:

(b-2-1) means for converting said first image signal into a second image signal expressing said second image levels for each second pixel; and the means (b-3) comprises:

(b-3-1) means for converting said first image signal into a third image signal expressing said third image levels for each third pixel, in which said third image signal is delayed from said second image signal in time.

12. The apparatus of claim 11, wherein the means (b-3-1) comprises:
(b-3-1-1) means for compressing signal levels of said first image signal to obtain said third image signal.

13. The apparatus of claim 12, wherein
the means (b-3-1-1) comprises:
(b-3-1-2) means for compressing signal levels of said first image signal through majority decision in each cluster of said first pixels to obtain said third image signal.

14. The apparatus of claim 11, wherein
the means (b-2-1) comprises:
(b-2-1-1) means for interpolating first image signal to obtain said second image signal.

* * * * *